(12) United States Patent
Acharya et al.

(10) Patent No.: US 9,889,401 B2
(45) Date of Patent: Feb. 13, 2018

(54) FLOW MANAGEMENT AND CO2-RECOVERY APPARATUS AND METHOD OF USE

(71) Applicant: General Electric Company, Schenectady, NY (US)

(72) Inventors: Harish Radhakrishna Acharya, Clifton Park, NY (US); Roger Allen Shisler, Ballston Spa, NY (US)

(73) Assignee: General Electric Company, Niskayuna, NY (US)

( * ) Notice: Subject to any disclaimer, the term of this patent is extended or adjusted under 35 U.S.C. 154(b) by 95 days.

(21) Appl. No.: 14/974,825

(22) Filed: Dec. 18, 2015

(65) Prior Publication Data
US 2017/0173520 A1    Jun. 22, 2017

(51) Int. Cl.
*B01D 53/22* (2006.01)
*F25J 3/02* (2006.01)
(Continued)

(52) U.S. Cl.
CPC ....... *B01D 53/229* (2013.01); *B01D 19/0068* (2013.01); *B01D 51/10* (2013.01);
(Continued)

(58) Field of Classification Search
CPC .. B01D 5/0057; B01D 19/0068; B01D 53/22; B01D 53/226; B01D 53/227;
(Continued)

(56) References Cited

U.S. PATENT DOCUMENTS 5,980,609 A * 11/1999 Baker ................. B01D 53/229
                                                           95/149
6,128,919 A   10/2000 Daus et al.
(Continued)

OTHER PUBLICATIONS

Nicot et al. "Common attributes of hydraulically fractured oil and gas production and CO2 geological sequestration", Greenhouse Gases: Science and Technology, vol. 2, Issue: 5, pp. 352-368, Oct. 2012.
(Continued)

*Primary Examiner* — Jason M Greene
(74) *Attorney, Agent, or Firm* — Pabitra K. Chakrabarti

(57) ABSTRACT

An apparatus and method for flow management and $CO_2$-recovery from a $CO_2$ containing hydrocarbon flow stream, such as a post $CO_2$-stimulation flowback stream. The apparatus including a flow control zone, a gas separation zone, a pretreatment zone, and a $CO_2$-capture zone. The $CO_2$-capture zone is in fluid communication with the pretreatment zone to provide $CO_2$-capture from a pretreated flowback gas stream and output a captured $CO_2$-flow stream. The $CO_2$-capture zone includes a flow splitter to direct a first portion of the pretreated flowback gas stream to a $CO_2$-enricher to provide an enriched $CO_2$-stream for mixing with a second portion of the pretreated flowback gas to form a mixed stream. The $CO_2$-capture zone further includes at least one condenser to output the captured $CO_2$-flow stream.

25 Claims, 29 Drawing Sheets

(51) Int. Cl.
*C10L 3/00* (2006.01)
*F25J 3/08* (2006.01)
*B01D 51/00* (2006.01)
*B01D 19/00* (2006.01)
*B01D 51/10* (2006.01)
*C10L 3/10* (2006.01)

(52) U.S. Cl.
CPC ......... *B01D 53/226* (2013.01); *B01D 53/227* (2013.01); *C10L 3/104* (2013.01); *F25J 3/0266* (2013.01); *F25J 3/08* (2013.01); *B01D 2053/221* (2013.01); *B01D 2256/22* (2013.01); *B01D 2257/304* (2013.01); *B01D 2257/80* (2013.01)

(58) Field of Classification Search
CPC . B01D 53/229; B01D 2257/504; C10L 3/104; F25J 3/0266; F25J 3/061; E21B 21/067
See application file for complete search history.

(56) References Cited

U.S. PATENT DOCUMENTS

| | | | |
|---|---|---|---|
| 6,234,258 B1* | 5/2001 | Karigan | E21B 21/062 166/267 |
| 6,955,704 B1* | 10/2005 | Strahan | B01D 53/22 166/267 |
| 7,964,020 B2 | 6/2011 | Baker et al. | |
| 8,585,802 B2 | 11/2013 | Keller | |
| 8,628,601 B2 | 1/2014 | Gearhart et al. | |
| 8,734,569 B2 | 5/2014 | Hasse et al. | |
| 8,839,875 B2 | 9/2014 | Enis et al. | |
| 8,911,535 B2 | 12/2014 | Kulkarni et al. | |
| 9,115,575 B2 | 4/2015 | MacAdam et al. | |
| 9,133,700 B2 | 9/2015 | Lissianski et al. | |
| 2008/0190025 A1* | 8/2008 | Stinson | F25J 3/0266 48/127.3 |
| 2011/0200491 A1* | 8/2011 | Wijmans | B01D 53/229 422/169 |
| 2012/0111051 A1* | 5/2012 | Kulkarni | F25J 3/0266 62/619 |
| 2014/0134695 A1 | 5/2014 | Zhou et al. | |
| 2015/0210936 A1* | 7/2015 | Burgers | F25J 3/0266 208/177 |
| 2016/0279561 A1* | 9/2016 | Burgers | B01D 53/226 |

OTHER PUBLICATIONS

Stewart et al., "A study of methods of carbon dioxide capture and sequestration—the sustainability of a photosynthetic bioreactor approach", Energy Conversion and Management, vol. 46, Issue: 3, pp. 403-420, Feb. 2005.

Figueroa et al., "Advances in CO2 capture technology—The U.S. Department of Energy's Carbon Sequestration Program", International Journal of Greenhouse Gas Control, vol. 2, Issue: 1, pp. 9-20, Jan. 2008.

Falk-Pedersen et al. "Separation of carbon dioxide from offshore gas turbine exhaust", Energy Conversion and Management, ScienceDirect, vol. 38, Supplement, 1997, pp. S81-S86.

* cited by examiner

| Case# | Flow-splitter strategy for FSR | Condenser 305 pressure, psig | Condenser 305 Temperature, °F | Membrane retentate (stream 46) $CO_2$-concentration, mole% | Average $CO_2$-concentration in $CO_2$-product (stream 58), mole% | Average C4+(NGLs)-concentration in $CO_2$-product (stream 58), mole% | Cumulative $CO_2$-recovery, % from flowback |
|---|---|---|---|---|---|---|---|
| Case1 | Fixed: FSR = 100% for all days | 900 | 50 | No membrane | 90.8% | 2.49% | 77.26% |
| Case2 | Fixed: FSR = 100% for all days | 900 | 50 | 30% | 91.7% | 2.21% | 87.65% |
| Case3 | Fixed: FSR = 80% for all days | 900 | 50 | 30% | 92.8% | 1.81% | 87.00% |
| Case4 | Fixed: FSR = 50% for all days | 900 | 50 | 30% | 94.7% | 1.18% | 85.97% |
| Case5 | Fixed: FSR = 0% for all days | 900 | 50 | 30% | 98.1% | 0.04% | 83.30% |
| Case6 | Objective mixed-stream 40 $CO_2$ = 90mole% | 900 | 50 | 30% | 94.8% | 1.15% | 86.36% |
| Case7 | Objective mixed-stream 40 $CO_2$ conc. >= 85mole% | 900 | 50 | 30% | 92.6% | 1.90% | 87.30% |
| Case8 | Objective $CO_2$-product $CO_2$-conc >= 95mole% | 900 | 50 | 30% | 95.0% | 1.07% | 85.66% |
| Case9 | Objective $CO_2$-product $CO_2$-conc >= 90mole% | 900 | 50 | 30% | 91.9% | 2.16% | 87.19% |

FIG. 20

FLOW MANAGEMENT AND CO2-RECOVERY APPARATUS AND METHOD OF USE

BACKGROUND

Embodiments disclosed herein relate generally to an apparatus and method of flow management and $CO_2$-recovery from a $CO_2$ containing hydrocarbon flow stream.

Hydraulic fracturing, commonly known as hydro fracturing, or simply fracturing, is a technique used to release petroleum, natural gas or other substances for extraction from underground reservoir rock formations. A wellbore is drilled into the reservoir rock formation, and a treatment fluid is pumped which causes fractures and allows for the release of trapped substances produced from these subterranean natural reservoirs. Current wellhead fracturing systems utilize a process wherein a slurry of fracturing fluid and proppant (e.g. sand) is created and then pumped into the well at high pressure. When water-based fracturing fluids are used, a process referred to as hydro fracturing, the proppant, water and appropriate chemicals can be mixed at atmospheric pressure and then pumped up to a higher pressure for injection into the well. However, if fluids other than water (e.g. liquid $CO_2$ or liquid propane) are used as the fracturing fluid, then these fluids must be kept at a sufficient pressure throughout the hydraulic fracturing system to avoid undesired vaporization. As a result, the blending of these fluids with proppant, chemicals, etc. must also be accomplished while the fluids are kept under a sufficiently high pressure.

$CO_2$-fracturing employs $CO_2$ to replace a significant portion, if not all of the water used in conventional hydrofracturing. The advantage of using $CO_2$ is improved hydrocarbon production through reduced damage to the formation and proppant pack. Additionally, the environmental problems associated with hydrofracturing, such as soil contamination due to top-side fluid spills and use of clean drinking water sources are greatly reduced. Yet several factors limit commercial application. Such factors include cost of $CO_2$, availability of $CO_2$, flaring of $CO_2$-rich hydrocarbon gases and effective proppant transport to name a few. $CO_2$ as a fracturing fluid must be injected at the well site as a supercritical liquid. Typically, $CO_2$-fracturing operations provide that the $CO_2$ utilized for well stimulation is delivered from an external source, stored on site and blended with proppant under pressure.

Wellpad operations after stimulation are typically characterized in two distinct periods: a flowback period and a production period. The flowback period typically lasts between 2 to 4 days. During this period, operations at the well-pad may entail different steps such as millout of the plugs that isolate the various stages in a horizontal well, cleanout of the well-bore of the sand or other solid material, installation of production tubing, etc. The flow from the well during this period is a mix of sand/water/oil/gas and "trash" from the milling out of the plugs. In addition, the flow exhibits high variability in flowrates and compositions including starts/stops as required, accomplishing various tasks in each of the steps.

Subsequent to the flowback period, the responsibility is transferred to the production crew. During the production period, the flow is typically only oil/water/gas with very small amounts of sand, if any, and stable flowrates relative to the flowback period. The pressures during the flowback period are also higher (between 1000 to 2000 psig) compared to those of the production period. More specifically, during the production period pressures are high, typically between 750-1000 psig, and gradually decline over time depending on the well configuration. The flowrates are also relatively stable during this production period as they are mainly dependent only on the well conditions.

After $CO_2$-stimulation, the flowback from a well during the flowback period is characterized by highly variable flowrates and compositions that change significantly over a period of days, e.g. gas flowrates changing from 10-15 million standard cubic feet per day (MMSCFD) to <2MMSCFD while $CO_2$-concentrations change from approximately 100% to 40% over a period of 2 to 4 days. Typically, the $CO_2$-rich flowback during this phase of operations is vented or flared because of the difficulties in designing a process that can keep up with the high variability in the flowrates and gas compositions over a period of 2 of 4 days.

During the production period, which may be from several months to several years, the gas flow rate and $CO_2$-concentration would depend on when the flowback period was terminated and the operating conditions (tubing diameter, pressure, choke strategy) employed. The amount of $CO_2$ in the flowback during the production period from a recovery perspective may be significant only for the first 30 days or so. The gas flowrates during this period would depend on the reservoir characteristics, the $CO_2$-stimulation conditions, the extent of flowback handling during the flowback period, and the flow conditions during the production period. For example, the gas flowrates may change from 2-5 MMSCFD to 1-2 MMSCFD while the $CO_2$-concentrations may change from 70% to 5%. After that initial period, the $CO_2$ present above the sales or pipeline specifications is a nuisance that requires clean up to meet specifications.

Accordingly, there is a need for an improved flow management and $CO_2$-capture system that provides for optimal recovery of $CO_2$ from a $CO_2$ containing hydrocarbon flow stream, such as a post $CO_2$-stimulation flowback, for reuse. Optimal recovery of the $CO_2$ is sought at desired specifications in keeping with equipment costs, footprint occupied at the wellpad, ease of commission, use, decommission and emission compliance.

BRIEF SUMMARY

These and other shortcomings of the prior art are addressed by the present disclosure, which provides an apparatus and method of recovering $CO_2$ from a $CO_2$ containing hydrocarbon flow stream, such as a flowback after well-stimulation with $CO_2$-rich fluids.

In accordance with an embodiment, provided is an apparatus for flow management and $CO_2$-recovery of a $CO_2$ containing hydrocarbon flow stream. The apparatus including a flow control zone, a gas separation zone, a pretreatment zone and a $CO_2$-capture zone. The flow control zone is in fluid communication with the $CO_2$ containing hydrocarbon flow stream to provide control of a flowrate of the $CO_2$ containing hydrocarbon flow stream and output a modified $CO_2$ containing hydrocarbon flow stream. The gas separation zone is in fluid communication with the modified $CO_2$ containing hydrocarbon flow stream to provide separation of a gas from the modified $CO_2$ containing hydrocarbon flow stream and output a $CO_2$ containing hydrocarbon process stream. The pretreatment zone is in fluid communication with the gas separation zone to provide removal of one or more of trace solids, aerogels, oil, hydrogen sulfides, water and non-gas liquids from the $CO_2$ containing hydrocarbon process stream and output a pretreated gas stream. The $CO_2$-capture zone is in fluid communication with the pretreatment zone to provide $CO_2$-capture from the pretreated flowback gas stream and output a captured $CO_2$-flow stream. The $CO_2$-capture zone including a flow splitter to direct a second portion of the pretreated flowback gas stream to a $CO_2$-enricher to provide an enriched $CO_2$-stream for mixing with a first portion of the pretreated flowback gas stream to form a mixed gas stream, the $CO_2$-capture zone further including at least one condenser to output the captured $CO_2$-flow stream.

In accordance with another embodiment, provided is an apparatus for flowback management and $CO_2$-recovery of a post $CO_2$-stimulation flowback stream. The apparatus including a flow control zone, a gas separation zone, a pretreatment zone and a $CO_2$-capture zone. The flow control zone is in fluid communication with the post $CO_2$-stimulation flowback stream to provide control of a flowrate of the post $CO_2$-stimulation flowback stream and output a modified flowback stream. The gas separation zone is in fluid communication with the modified flowback stream to provide separation of a gas from the modified flowback and output a flowback process stream. The pretreatment zone is in fluid communication with the gas separation zone to provide removal of one or more of trace solids, aerogels, oil, hydrogen sulfides, water and non-gas liquids from the flowback process stream and output a pretreated flowback gas stream. The $CO_2$-capture zone is in fluid communication with the pretreatment zone to provide $CO_2$-capture from the pretreated flowback gas stream and output a captured $CO_2$-flow stream, the $CO_2$-capture zone including a flow splitter to direct a first portion of the pretreated flowback gas stream to a $CO_2$-enricher to provide an enriched $CO_2$-stream for mixing with a second portion of the pretreated flowback gas to form a mixed gas stream, the $CO_2$-capture zone further including at least one condenser to output the captured $CO_2$-flow stream.

In accordance with another embodiment, provided is an apparatus for flowback management and $CO_2$-recovery of a post $CO_2$-stimulation flowback stream. The apparatus including a flowback processing unit, a pretreatment unit and a flow splitter. The flowback processing unit is configured to receive and process post $CO_2$-stimulation flowback stream and output a flowback stream at desired pressure and temperature. The pretreatment unit is configured to receive and remove contaminants from the flowback stream and output a pretreated flowback stream. The flow splitter is in fluid communication with the pretreatment unit to direct a first portion of the pretreated flowback stream to a condenser and a second portion of the pretreated flowback stream to a $CO_2$-enricher to output an enriched $CO_2$ flow stream to mix with the first portion of the pretreated flowback stream and output from the condenser a captured $CO_2$ flow stream.

In accordance with yet another embodiment, provided is a method of flowback management and $CO_2$-recovery of a post $CO_2$-stimulation flowback stream. The method including processing post $CO_2$-stimulation flowback stream to yield a processed flowback stream at a desired pressure and temperature, pretreating the processed flowback stream to remove one or more contaminants and output a pretreated flowback stream, directing a first portion of the pretreated flowback stream to a condenser and directing a second portion of the pretreated flowback stream to a $CO_2$-enricher, the $CO_2$-enricher outputting an enriched $CO_2$-flow stream to mix with the first portion of the pretreated flowback stream and provide a captured $CO_2$-flow stream and transferring the captured $CO_2$-flow stream as a $CO_2$-product stream for product end use.

Other objects and advantages of the present disclosure will become apparent upon reading the following detailed description and the appended claims with reference to the accompanying drawings.

BRIEF DESCRIPTION OF THE FIGURES

The above and other features, aspects, and advantages of the present disclosure will become better understood when the following detailed description is read with reference to the accompanying drawings in which like characters represent like parts throughout the drawings, wherein:

FIG. 20 is a table documenting the effect of flow splitter strategy for flowback management on the $CO_2$-product purity and recovery for Case Studies 1-8, in accordance with one or more embodiments shown or described herein;

DETAILED DESCRIPTION

This disclosure will be described for the purposes of illustration only in connection with certain embodiments; however, it is to be understood that other objects and advantages of the present disclosure will be made apparent by the following description of the drawings according to the disclosure. While preferred embodiments are disclosed, they are not intended to be limiting. Rather, the general principles set forth herein are considered to be merely illustrative of the scope of the present disclosure and it is to be further understood that numerous changes may be made without straying from the scope of the present disclosure.

Preferred embodiments of the present disclosure are illustrated in the figures with like numerals being used to refer to like and corresponding parts of the various drawings. It is also understood that terms such as "top", "bottom", "outward", "inward", and the like are words of convenience and are not to be construed as limiting terms. It is to be noted that the terms "first," "second," and the like, as used herein do not denote any order, quantity, or importance, but rather are used to distinguish one element from another. The terms "a" and "an" do not denote a limitation of quantity, but rather denote the presence of at least one of the referenced item. The modifier "about" and "approximately" used in connection with a quantity is inclusive of the stated value and has the meaning dictated by the context (e.g., includes the degree of error associated with measurement of the particular quantity).

Figure 1:
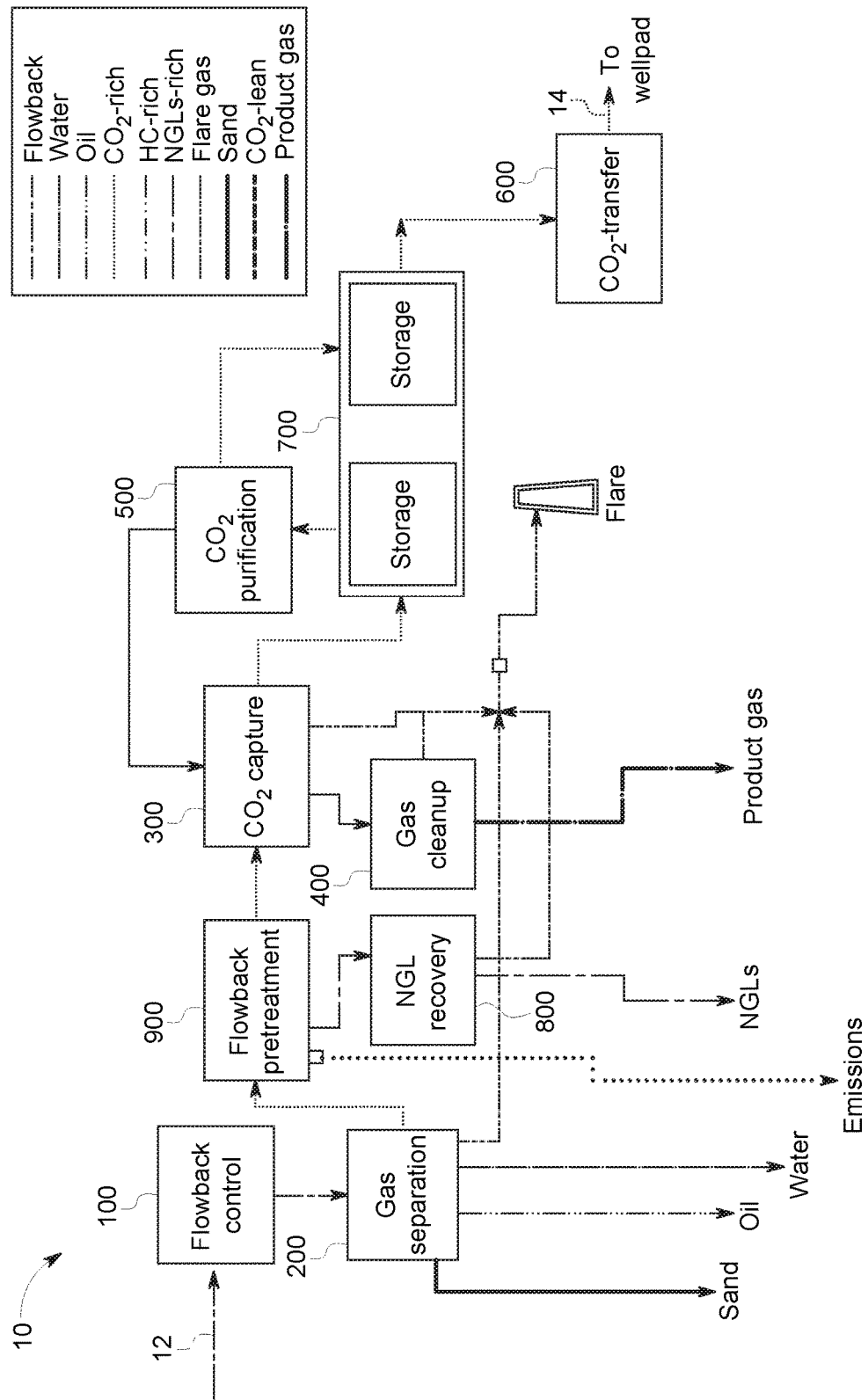
FIG. 1 is a schematic diagram of an apparatus for flowback management and $CO_2$-recovery of a post $CO_2$-stimulation flowback stream, in accordance with one or more embodiments shown or described herein.

Referring to the drawings wherein, as previously stated, identical reference numerals denote the same elements throughout the various views, FIG. 1 depicts in a simplified block diagram, elements of an apparatus for flow management and $CO_2$-recovery 10 including $CO_2$-recapture, according to an embodiment. More particularly, the apparatus 10 provides flowback management and a means for recovering $CO_2$ from a flowback after well-stimulation with $CO_2$-rich fluids. The apparatus 10 includes a flow control zone 100 in fluid communication with a post $CO_2$-stimulation flowback stream 12 (also referred to herein as a flowback stream 12), a gas separation zone 200 in fluid communication with the flow control zone 100, a pretreatment zone 900 in fluid communication with the gas separation zone 200, a $CO_2$-capture zone 300 in fluid communication with the pretreatment zone 900, a gas cleanup zone 400 in fluid communication with the capture zone 300, an optional $CO_2$-storage zone 700 in fluid communication with the $CO_2$-capture zone 300, a $CO_2$-purification zone 500 in fluid communication with at least one of the $CO_2$-capture zone 300 and the $CO_2$-storage zone 700, and a $CO_2$-transfer zone 600 in fluid communication with at least one of the $CO_2$-storage zone 700 and the $CO_2$-purification zone 500 to provide transfer of a $CO_2$-product stream 14 for product end use. An optional natural gas liquid (NGL) recovery zone 800 may further be included in fluid communication with the pretreatment zone 900.

The flowback stream 12 from stimulations based on $CO_2$-rich fluids is highly dependent on the reservoir, the amount of $CO_2$ used for stimulation, the operating conditions during the $CO_2$-stimulation and the flowback conditions. In effect, the rate and composition of the flowback stream 12 will vary between wells with time. The flowback management strategy disclosed herein provides for optimization of the $CO_2$-recovery on a continual basis during the flowback period or the production period. More particularly, the flowback management and $CO_2$-recovery apparatus 10 disclosed herein provides a means to respond to changes in the flowrate in order to control the $CO_2$-recovery process operating conditions to yield $CO_2$-purity within a desired range.

As previously stated, the flowback stream 12 from stimulations based on $CO_2$-rich fluids is characterized by very high initial gas flowrate that contains very high concentrations of $CO_2$ and a rapid decline in $CO_2$ flowrates within a few days of flowback. The disclosed apparatus and method address this change in flowrate and render the $CO_2$-product stream 14 for reuse in the oil and gas industry, e.g. for reuse in subsequent fracturing operations and $CO_2$-based enhanced oil recovery (EOR).

As previously alluded to, current industrial practice provides when the percentage of $CO_2$ is high (e.g. >80% $CO_2$), the gas is vented or flared with hydrocarbon fuel added to ensure combustion and when the percentage of $CO_2$ is between 50% and 80% the gas may be flared directly and when CO2-concentration is <50% but still higher than the pipeline-quality (e.g. ~2-5%), the gas is either flared or sent for gas-cleanup (e.g. gas-permeation membrane selective to $CO_2$-permeation) to make pipeline-quality natural gas. In either case, the $CO_2$ in the flowback stream 12 is not recovered for reuse. The disclosure contained herein addresses $CO_2$-capture from a post-stimulation flowback, and more particularly, the changes in flowrate and composition of the flowback stream in terms of: (i) flowback management and control systems to manage transients; (ii) $CO_2$-capture, by providing optimal recovery of $CO_2$ from the flowback stream based on capital expenditures (CAPEX), operating expenditures (OPEX), a footprint occupied at the wellpad, utilities (power, refrigeration), ease of commission/use/de-commission, operability at well-site, emissions regulations, and value of the recovered $CO_2$ from the flowback stream; (iii) $CO_2$-purification to render a $CO_2$-product that meets reuse needs as well as intermediate transport and storage needs; and (iv) changing process configurations amenable to changing field conditions, e.g. flowback crew operations vs. production crew operations.

Figure 2:
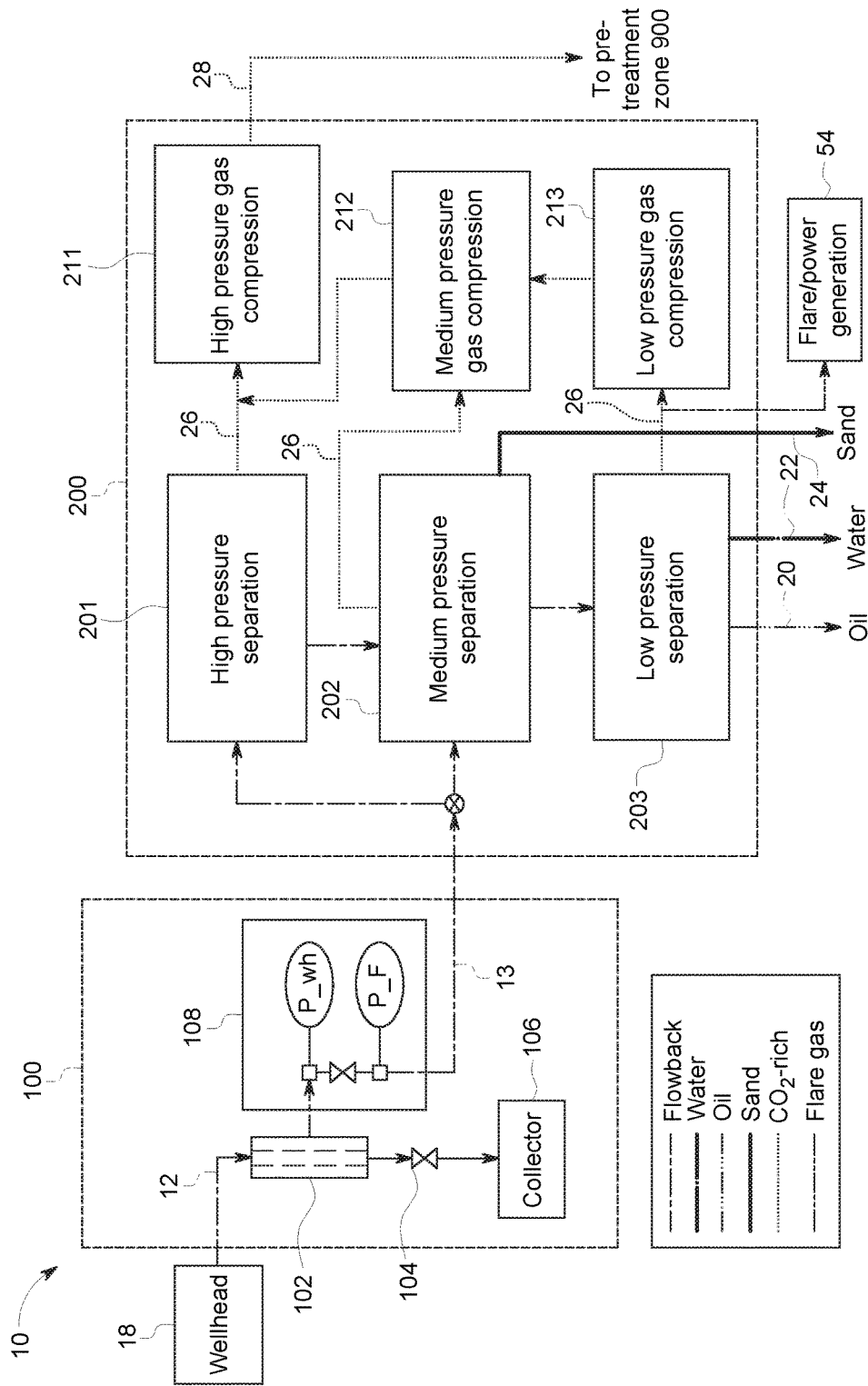
FIG. 2 is a further detailed schematic diagram of a portion of the apparatus of FIG. 1, in accordance with one or more embodiments shown or described herein.
Figure 3:
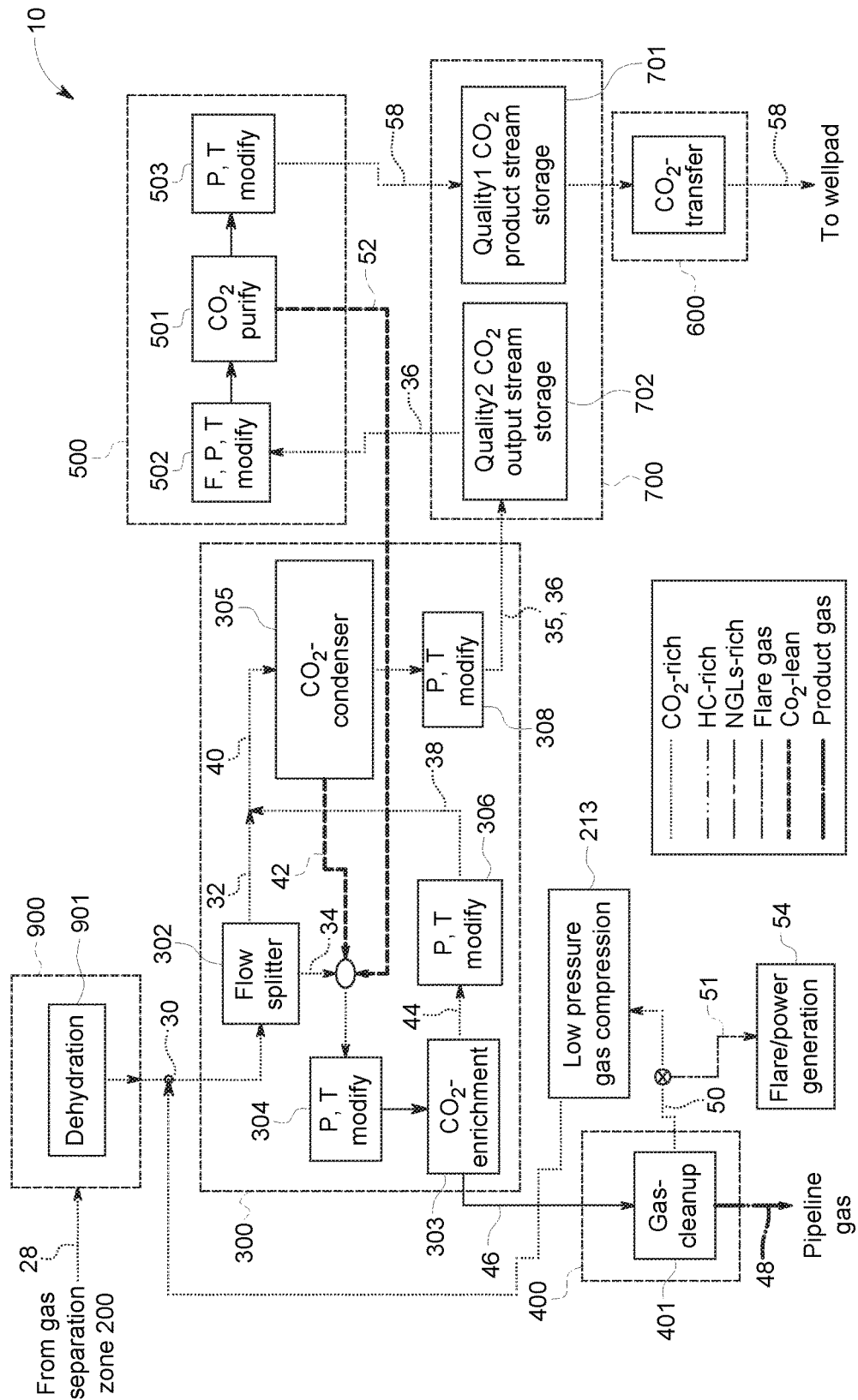
FIG. 3 is a further detailed schematic diagram of a portion of the apparatus of FIG. 1, in accordance with one or more embodiments shown or described herein.

Referring more specifically to FIGS. 2 and 3, illustrated are further detailed schematic diagrams of the apparatus of FIG. 1. More particularly, further illustrated are each individual zone as it relates to the overall apparatus 10. Referring to FIG. 2, a flowback stream 12 from a wellhead 18 is initially input to the flow control zone 100. In the flow control zone 100, the flowrate F of the flowback stream 12 is controlled as it is output toward the downstream zones to undergo the $CO_2$-capture process. In an embodiment, during flowback crew operations, "trash", such as the large particles obtained during the millout of the plugs isolating the fracturing stages, is removed from the flowback stream 12, via a separator 102 and collected in a collector 106. During production crew operation there is no trash collector as there is no trash or for that matter no, or minimal, sand anticipated in the flowback stream 12. A choke valve 108 provides for control of the flowback stream 12. More specifically, in an embodiment the choke valve 108 may provide a decrease in the wellhead pressure (P_wh) to a desired flowback pressure (P_F). The flowback stream 12 is output from the flow control zone 100 as a modified flowback stream 13 and enters the gas separation zone 200.

In the gas separation zone 200, the gas portion of the modified flowback stream 13 is further controlled prior to reaching the pretreatment zone 900 and $CO_2$-capture zone 300. More particularly, the gas portion of the modified flowback stream 13 is separated from oil 20 and water 22 contained in the modified flowback stream 13 and if present, sand 24 at a maximum possible pressure (P_H) (e.g. 700 to <1050 psi) in a high pressure gas separator 201 depending on the wellhead pressure and choking constraints. Additional separation of the modified flowback stream 13 components may take place in a medium pressure (P_M) gas separator 202 and in a low pressure (P_L) gas separator 203. It is noted that the pressure (P) of the modified flowback stream 13 is less than the critical pressure of $CO_2$ (P<Pc of $CO_2$ (1050 psi)). In an embodiment, the medium pressure gas separator 202 operates at a P_M in range of 300 to 700 psi. In an embodiment, the low pressure gas separator 203 serves to further degas the oil 20 and water 22 to recover residual gases and operates at a P_L~atmospheric pressure (e.g. <100 psi). Next, an output gas stream 26 from each of the gas separators 201, 202 and 203 is compressed to a desired pressure (P_CC) in a high pressure gas compressor 211, a medium pressure gas compressor 212 and a low pressure gas compressor 213, respectively. It is noted that in an embodiment, no compressor(s) may be required if the pressure of the output gas stream 26 is high enough to enter the pretreatment zone 900 and eventually the $CO_2$-capture zone 300. A set value for the P_CC could range between 300 to 900 psi depending on design condition in the downstream $CO_2$-capture zone 300. More specifically, as illustrated, an output gas stream 26 from the high pressure gas separator 201 is compressed in the high pressure gas compressor 211. An output gas stream 26 from the medium pressure gas separator 202 is compressed in the medium pressure gas compressor 212 and subsequently in the high pressure compressor 211. An output gas stream 26 from the low pressure gas separator 202 is compressed in the low pressure gas compressor 212 and subsequently in the medium pressure gas compressor 212 and the high pressure compressor 211. Optionally, the output gas stream 26 from the low pressure gas separator 203, or a portion thereof, may not be compressed in the low pressure compressor 213 and subsequently directed to the $CO_2$-capture zone 300 for $CO_2$-recovery, but instead sent either to flare or for power generation, generally referenced 54. In an embodiment the oil 20 and water 22 streams may be isolated in the medium pressure gas separator 202 and the final degassing of the oil 20 and water 22 streams may happen in separate vessels or same vessel in the low pressure gas separator 203. In an embodiment, the output gas streams 26 fed to the compressors 211, 212 and 213 undergoes pretreatment that includes filtration for trace solids and aerogels and coalescers to avoid carryover of produced water 22 and oil 20 to the compressors 211, 212 and 213. A flowback process stream 28 is output from the gas separation zone 200 and enters the pretreatment zone 900, as best illustrated in FIG. 3.

Referring now to FIG. 3, the pretreatment zone 900 provides for the removal of trace solids, aerogels, oil, $H_2S$ and water from the flowback process stream 28 to meet $CO_2$-product specifications. To provide such, the pretreatment zone 900 includes a dehydrator 901 that is configured to respond to target $CO_2$-product specifications. For example, liquid $CO_2$ at 350 psi and −10° F. would require dehydration to <2 ppmv water in the flowback process stream 28 in the dehydrator 901. However, dense $CO_2$ at 2,000 psi and 70° F. would require less dehydration to 100 ppmv water in the flowback process stream 28 in the dehydrator 901. It should be understood that throughout this disclosure the target $CO_2$-product specifications may be in terms of % $CO_2$ or in terms of undesired components in the $CO_2$-product, for example, volatiles (Cl, $N_2$), or benzene, toluene, ethylbenzene and xylenes (BTEX) or $H_2S$.

Dehydration in the pretreatment zone 900 may be accomplished via use of one or more of: (a) molecular sieve beds; (b) $H_2O$-selective gas permeation membranes with polishing removal using molecular sieve beds, if necessary; and/or (c) dessicant beds, such as calcium chloride ($CaCl_2$), lithium chloride (LiCl), etc. followed by molecular sieve beds for deep dehydration, if necessary. Schemes (b) and (c) may result in smaller molecular sieve beds, if necessary, for deep dehydration. In addition, hydrogen sulfide ($H_2S$) removal, if necessary, may be accomplished using scavengers such as triazine or solid sorbents or $H_2S$-selective membranes.

In an embodiment the pretreatment zone 900, may further provide, when necessary, for natural gas liquids (NGLs) removal in a NGL removal component (described presently), or as previously alluded to, NGL removal may be completed in an NGL recovery zone 800 (described presently) prior to reaching or integrated into the pretreatment zone 900. A pretreated flowback process stream 30 is next output from the pretreatment zone 900 and enters the $CO_2$-capture zone 300 of apparatus 10.

In an embodiment, the $CO_2$-capture zone 300 provides for $CO_2$-capture from the pretreated flowback process stream 30 via condensation at a medium-to-high pressure, control of the condenser temperature (T_Cond), and $CO_2$-enrichment for high $CO_2$-concentration in the captured $CO_2$. A flow splitter 302 within the $CO_2$-capture zone 300 receives the pretreated flowback process stream 30 from the pretreatment zone 900 and provides for a portion 32 of the pretreated flowback process stream 30 to flow to a condenser 305 and a portion 34 to flow to a $CO_2$-enricher 303. The flow splitter 302 is operational to vary the portion 32 of the pretreated flowback process stream 30 to the condenser 305 to meet target $CO_2$-product specifications at one or more locations in the apparatus (described presently). The flow splitter 302 is operational to vary the portion 32 of the pretreated flowback process stream 30 to the condenser 305 between 0%-100%.

The flow splitter 302, $CO_2$-enricher 303 and condenser 305 provide a means, when used in combination, to provide a captured $CO_2$-flow stream 35 in the form of an intermediate quality $CO_2$-output stream, referred to herein as a Quality2 $CO_2$-output stream (x_Q2) 36, from the $CO_2$-capture zone 300 that remains in a desired $CO_2$-concentration range even as the $CO_2$-concentration in the flowback stream 12 changes with time. In an embodiment x_Q2 may be defined in terms of $CO_2$-concentration (e.g. 90% $CO_2$) or a volatile component, such as methane (e.g. 5% Cl). In an embodiment, the Quality2 $CO_2$-output stream 36 may be of sufficient purity for reuse purposes, requiring no further processing. Alternatively, the Quality2 $CO_2$-output stream 36 may be further purified, as described presently in the purification zone 500. In an embodiment, the Quality2 $CO_2$-output stream 36 may be directed to a remote site for further purification. In an embodiment the $CO_2$-concentration in the Quality2 $CO_2$-output stream 36 is in a range of 85% to 99%. In an embodiment the methane concentration in the Quality2 $CO_2$-output stream 36 is in a range of 1% to 10%.

The flow splitter 302 directs the portion 34 of the pretreated flowback process stream 30 to the $CO_2$-enricher 303 and yields, via a $CO_2$-rich permeate stream 44 (described presently), an enriched $CO_2$-stream 38 that mixes with the portion 32 of the pretreated flowback process stream 30 from the flow splitter 302, forming a combined, or mixed, gas stream 40. The combined, or mixed, gas stream 40 is sent to the condenser 305 where the bulk of the $CO_2$ is condensed as a liquid. In an embodiment, a residual gas stream 42 from the condenser 305 is returned to the enricher 303 for enrichment. The condensed liquid in the condenser 305, as previously identified, is referred to as the Quality2 $CO_2$-output stream 36. In an embodiment, the amount of flowback diversion via the flow splitter 302 to the $CO_2$-enricher 303 is dependent on the $CO_2$-concentrations in the flowback stream 12 entering the apparatus 10, the operating conditions in the $CO_2$-enricher 303, and the desired Quality2 $CO_2$-concentration (y_Q2). In that the $CO_2$-concentration in the flowback stream 12 changes with time, the extent of flow splitting in the flow splitter 302 can be modified in order to control the concentration (y_Cond) of $CO_2$ entering the condenser 305.

The operating conditions in the condenser 305, and more specifically the temperature (T_Cond) and pressure (P_Cond) in the condenser 305, are chosen to minimize the overall energy consumption and footprint. As a first example, for P_Cond=900 psi, the value of T_Cond would be approximately 55° F. to 60° F. to render a condensed Quality2 $CO_2$ phase with y_$CO_2$=90% $CO_2$. As a second example, for P_Cond=350 psi, the value of T_Cond would be approximately 0° F. to yield the similar Quality2 $CO_2$-concentration. While the process of first example requires more gas compression vs the second example, it requires less refrigeration costs. In an embodiment, a vapor-liquid separator (not shown) may be associated with the condenser 305 to provide a liquid of desired Quality2 $CO_2$ while the residual gas stream 42 is directed to the downstream $CO_2$-recovery.

In an embodiment, the $CO_2$-enricher 303 employs a $CO_2$-selective membrane process. In an embodiment, the $CO_2$-enricher 303 is stable to hydrocarbon condensates. In an embodiment, the $CO_2$-enricher 303 may include one or more membranes formed of films or hollow fibers, comprised of $CO_2$-selective materials, such as polyetheretherketone (PEEK), cellulose acetate, polyimides, or the like. The membrane material and operating conditions are chosen so that the $CO_2$-concentration of the $CO_2$-rich permeate stream 44 is greater than in the flowback stream 12 concentration. In an embodiment the $CO_2$-concentration in the $CO_2$-rich permeate stream 44 is in a range of 85% to >99%. This provides that the combined gas stream 40 entering the condenser 305 is sufficient to yield the desired value of x_Q2. In an embodiment, the temperature and pressure of the portion 34 of the pretreated flowback process stream 30 entering the $CO_2$-enricher 303 are manipulated via a compressor 304, including one of an after-cooler or a heat-exchanger. Similarly, the pressure on the permeate-side of the enricher 303 is chosen so that the desired enrichment in the $CO_2$-rich permeate 44, and more specifically the enriched $CO_2$-stream 38, is achieved based on feed concentrations and membrane modular sizes employed. A compressor 306 disposed downstream of the enricher 303 serves to compress the $CO_2$-rich permeate 44 exiting the enricher 303 at the P_Cond pressure.

It is noted that due to permeation of the gaseous components across the membrane of the enricher 303 and consequent gas-expansion there may be some cooling of the portion 34 of the pretreated flowback process stream 30 due to the Joule-Thompson effect. The extent of cooling depends on the pressure drop and the J-T coefficients of the components involved. This drop in temperature decreases the flux rate through the membrane of the enricher 303. This cooling, especially on the high pressure (feed or retentate) side of the membrane of the enricher 303 may cause condensation of higher-boiling hydrocarbon (NGLs) components.

Of particular interest is the choice of $CO_2$-concentration in a $CO_2$-lean gas retentate (non-permeate) stream 46 of the enricher 303. If the design value of the $CO_2$-lean gas retentate stream 46 is chosen to be very small, greater $CO_2$-recovery in the permeate stream 44, and more particularly into the enriched $CO_2$-stream 38, is achieved. However, low design values of $CO_2$ in the $CO_2$-lean gas retentate stream 46 may also result in lower $CO_2$-concentration in the permeate stream 44 and thus the combined, or mixed, gas stream 40 entering the condenser 305. Hence, in order to achieve the desired concentration (y_Cond) of $CO_2$ entering the condenser 305, the extent of separation in the membrane of the enricher 303 may be controlled by choosing an optimal value for the $CO_2$-concentration in the $CO_2$-lean gas retentate stream 46. The value of the $CO_2$-concentration in the $CO_2$-lean gas retentate stream 46 may aid in the design of the membrane in the enricher 303, with dependency on the feed concentrations and the permeation/selectivity properties of the membrane employed. For example, the value of the $CO_2$-concentration in the $CO_2$-lean gas retentate stream 46, for design purposes, may be limited to >10% $CO_2$ when the portion 34 of the pretreated flowback process stream 30 to the enricher 303 is >50% for a membrane that has a selectivity of >10 for $CO_2$ relative to Cl. However, this value may be different if the portion 34 of the pretreated flowback process stream 30 to the enricher 303 contains only 30% $CO_2$. The $CO_2$-lean gas retentate stream 46 is output as a $CO_2$-lean gas from the enricher 303 of the $CO_2$-capture zone 300 to the gas cleanup zone 400.

The $CO_2$-lean gas retentate stream 46 is treated in the gas cleanup zone 400 to render a pipeline-quality natural gas stream 48 (e.g. 2% to 5% $CO_2$ and <7 lbs/MMSCF $H_2O$). A $CO_2$-selective gas-separation membrane may be used in the gas cleanup zone 400 to provide such pipeline-quality natural gas stream 48. In addition, treatment of the $CO_2$-lean gas retentate stream 46 may render a $CO_2$-rich permeate stream 50 having a low amount of $CO_2$ and hence may be flared as a flare gas 51 via a flare 52, used as a fuel for on-site power generation, or returned to the low pressure gas compressor 213 for further processing.

Of particular relevance in apparatus 10 is the storage of the Quality2 $CO_2$-output stream 36 from the $CO_2$-capture zone 300 within the $CO_2$-storage zone 700, and more particularly, within one or more Quality2 $CO_2$-storage tanks 702 in the $CO_2$-storage zone 700. The storage of the intermediate Quality2 $CO_2$-output stream 36 within the storage zone 700 provides control of a flowrate of the Quality2 $CO_2$-output stream 36 to the downstream purification zone 500. This control of the flowrate ensures smooth operating conditions in a distillation column (described presently) in the purification zone 500. In an embodiment, the storage pressure and temperature conditions may be different from the pressure and temperature conditions in the condenser 305 of the $CO_2$-capture zone 300 or in the purification zone 500. In an embodiment, the storage conditions in the storage zone 700 may be chosen for optimal storage tank costs and footprint, and energy usage. However, under certain conditions when the process operations in the 305 condenser result in a Quality2 $CO_2$-output stream 36 suitable for reuse, storage of the product in storage tanks 702 and further processing is not required.

Located downstream of the storage zone 700 is the purification zone 500, where the Quality2 $CO_2$-output stream 36 produced in the $CO_2$-capture zone 300 is purified to render a $CO_2$-product stream fit for reuse, referred to herein as Quality1 $CO_2$-product stream 58. In an embodiment, the purification zone 500 utilizes distillation in a purifier 501 to purify the Quality2 $CO_2$-output stream 36 wherein a bottom stream is the Quality1 $CO_2$-product stream 58 while a $CO_2$-lean distillate may be returned in a $CO_2$-lean distillate stream 52 to the $CO_2$-enricher 303 for $CO_2$-recovery. The choice of the distillation pressure and temperature conditions is important and is based on the $CO_2$-product end-use as well as storage and transfer requirements. For example, for conventional liquid $CO_2$-transport trucks operating at approximately 350 psig and −10° F., it is necessary to reduce the volatile components, mainly Cl and N2 to low values (e.g. <1% to 3 vol %). However, for transport in high-pressure tanks, such as 2,000 psi, higher amounts of these components may be allowed. In addition, in an embodiment the choice of the pressure and temperature may be optimized for reduced footprint and energy used for refrigeration of the condenser in the distillation column as well as for product-cooling.

A flowrate, temperature and pressure of the Quality2 $CO_2$-output stream 36 entering the purifier 501 may be manipulated via a component 502, including one of a liquid pump if a higher pressure is desired or a depressuring valve if a lower pressure is desired, and optionally a heat exchanger to control temperature. Accordingly, the feed conditions to the purifier 501 for the purification process are controlled by controlling the feed concentration y_$CO_2$ in the $CO_2$-capture zone 300, as previously described, and the flowrate via the component 502.

The Quality1 $CO_2$-product stream 58 output from the purification zone 500 may be stored within a $CO_2$-storage zone 700, and more particularly, within one or more Quality1 $CO_2$-storage tanks 701 in the $CO_2$-storage zone 700. The storage of the Quality1 $CO_2$-product stream 58 within the storage zone 700 may provide control of a flowrate of the Quality1 $CO_2$-product stream 58 to the downstream $CO_2$-transfer zone 600. In an embodiment, the storage pressure and temperature conditions may be different from the pressure and temperature conditions in the condenser 305 of the $CO_2$-capture zone 300 or in the purification zone 500. As previously indicated, in an embodiment, the storage conditions in the storage zone 700 may be chosen for optimal storage tank costs and footprint, and energy usage.

To accommodate the variable flowback rate profile, apparatus 10, and more particularly the process equipment, such as compressors, heat-exchangers, separation vessels, membrane modules, liquid pumps in the different zones as discussed above are each chosen as a system of parallel units that are appropriately sized so that the entire flowrate regime can be handled without incurring over-design or under-design issues for desired separation or heat-transfer performance. For example, the flowrate of the flowback stream 12 from the wellhead 18 may range from 2 MMSCFD to 15 MMSCFD over a flowback period. Hence, the gas compressors in the gas separation zone 200 may be organized as three individual compressors configured in a parallel arrangement, with each compressor having a capacity range of 2 to 5 MMSCFD, allowing the capability to handle flows from 2 to 15 MMSCFD by employing only one or all three of the compressors. Moreover, the lower range of the capacity may be further reduced to <1 MMSCFD by recirculating some of the gas streams exiting each of the compressors at an outlet of each, back to a respective compressor-inlet after cooling. Similarly, the membrane modules utilized in the apparatus 10 may be appropriately chosen to be a system of parallel modules (described presently) that may be switched on as needed depending on a flowrate of an input feed to a respective membrane section.

Figure 4A:
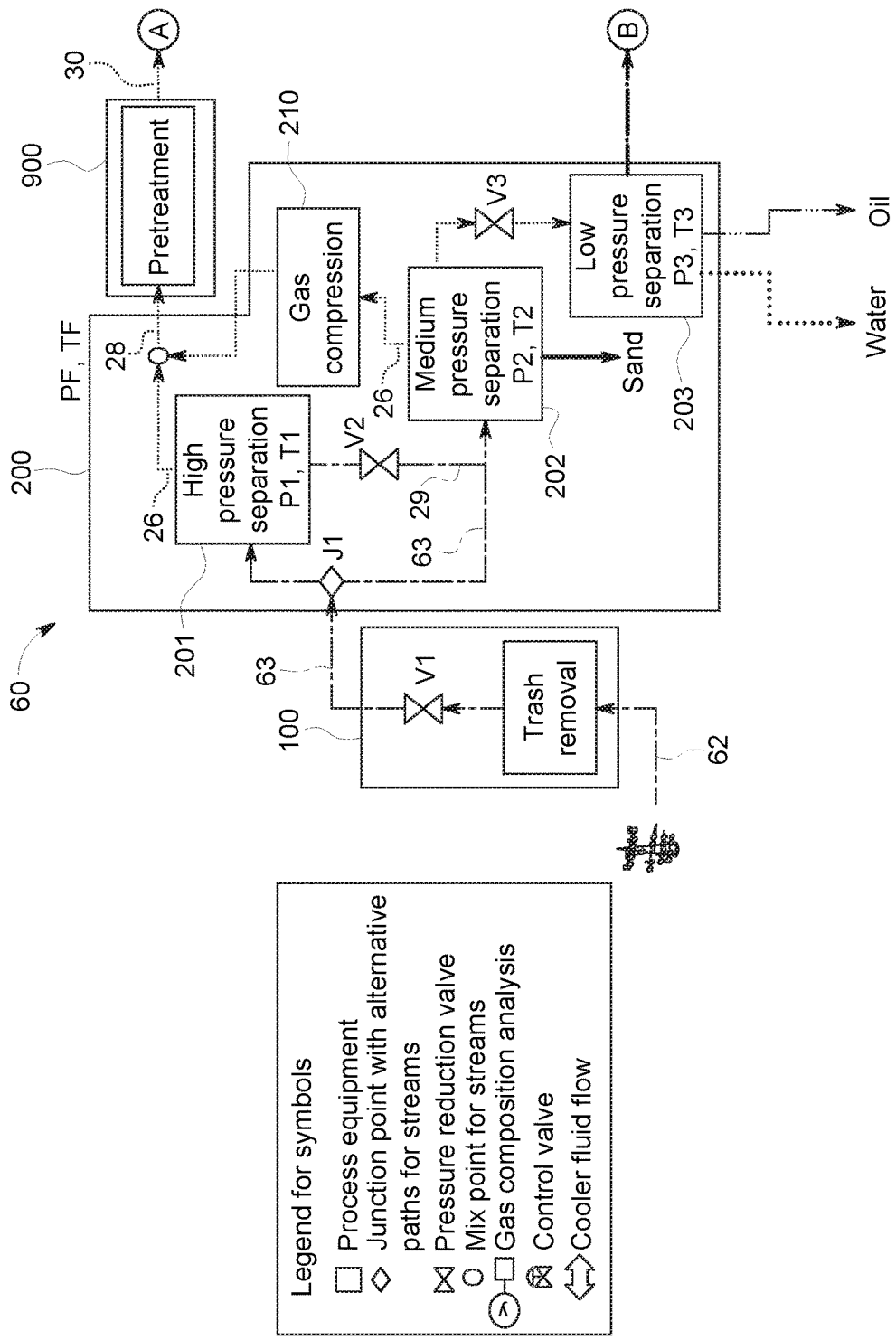
FIG. 4A is a detailed schematic diagram of an apparatus for flowback management and $CO_2$-recovery of a high pressure post $CO_2$-stimulation flowback stream, in accordance with one or more embodiments shown or described herein.
Figure 4B:
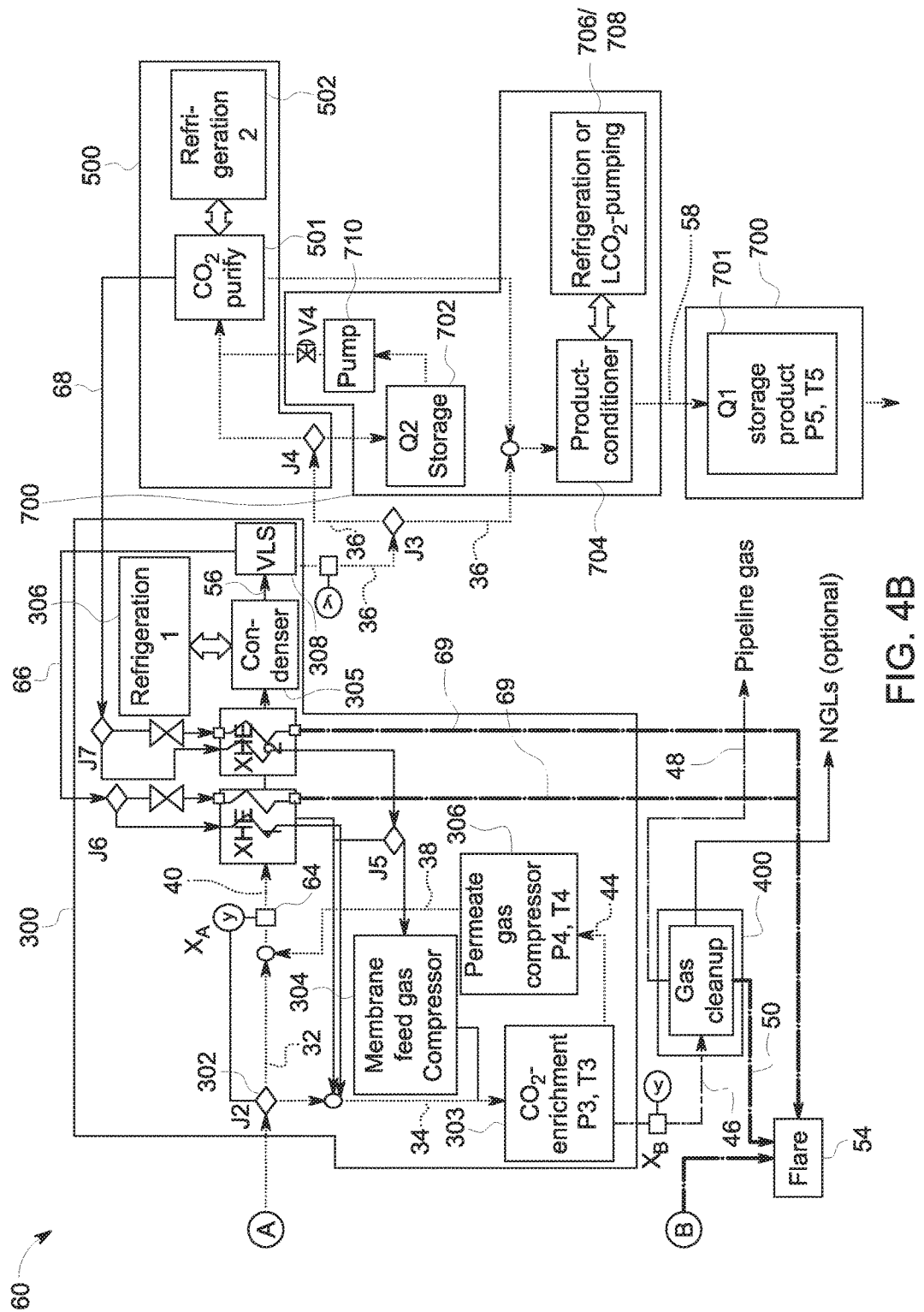
FIG. 4B is a continuation of the diagram of FIG. 4A illustrating an apparatus for flowback management and $CO_2$-recovery of a high pressure post $CO_2$-stimulation flowback stream, in accordance with one or more embodiments shown or described herein.
Figure 5:
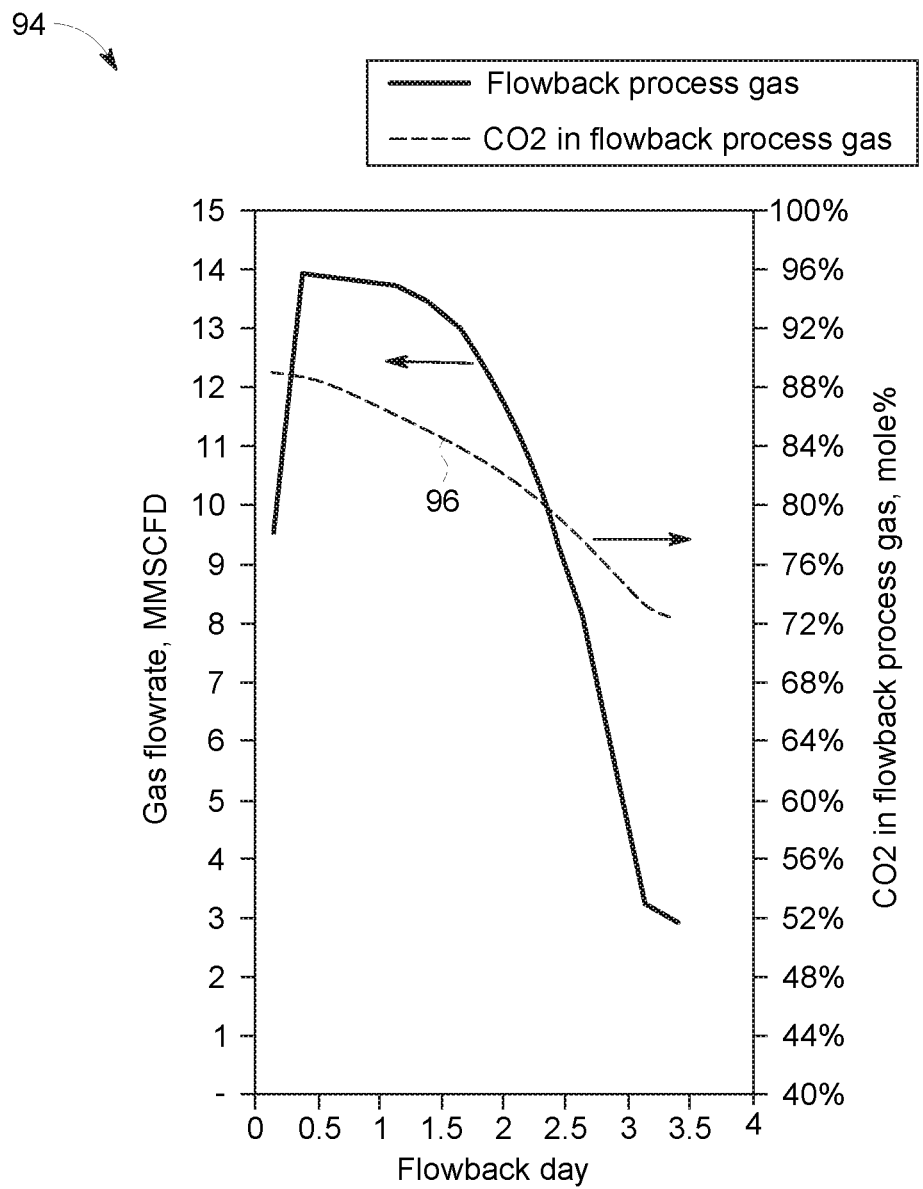
FIG. 5 is a graphical representation illustrating the gas flowrates as a function of time, in accordance with one or more embodiments shown or described herein.
Figure 6A:
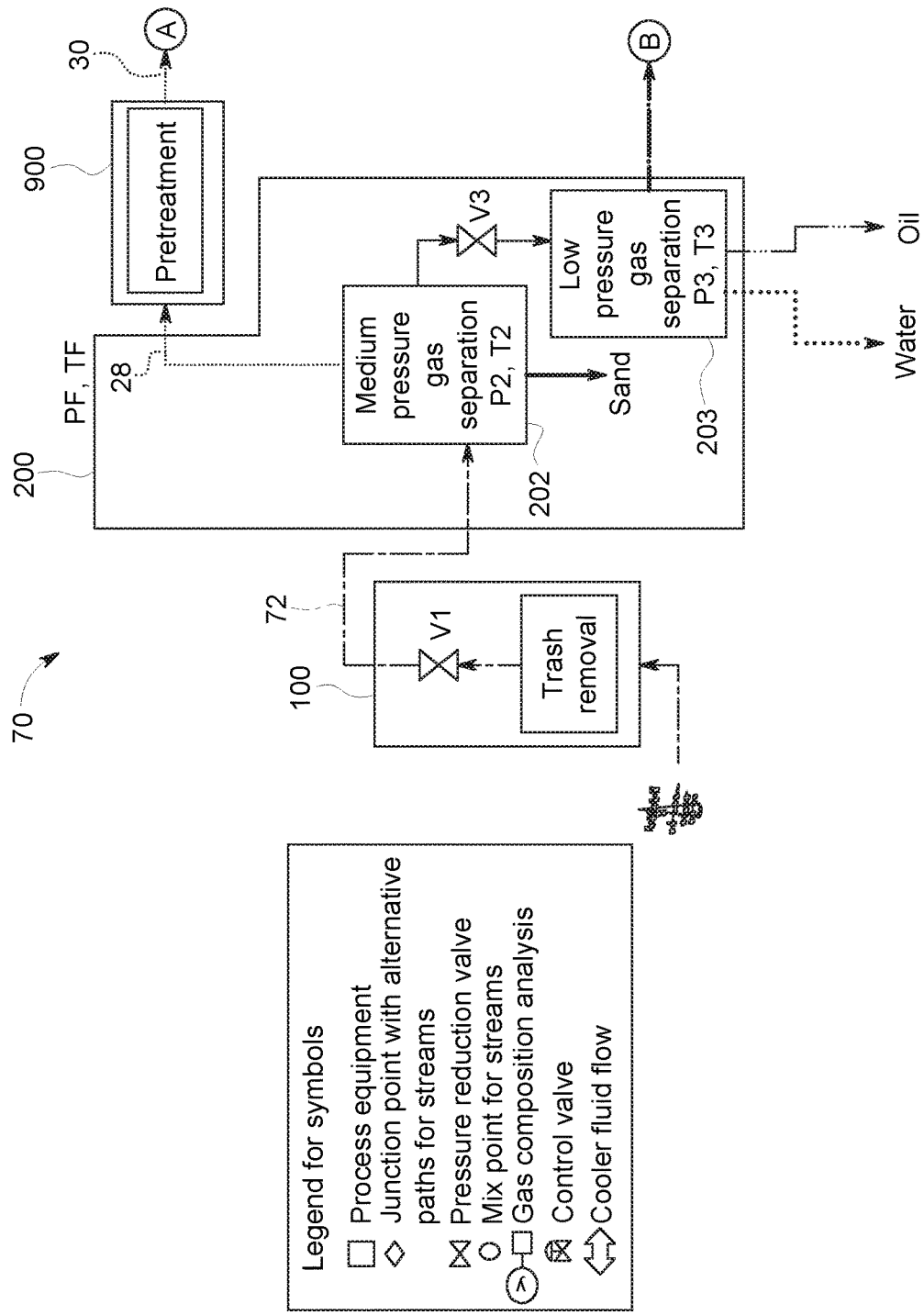
FIG. 6A is a detailed schematic diagram of an apparatus for flowback management and CO2-recovery of a low pressure post CO2-stimulation flowback stream, in accordance with one or more embodiments shown or described herein.
Figure 6B:
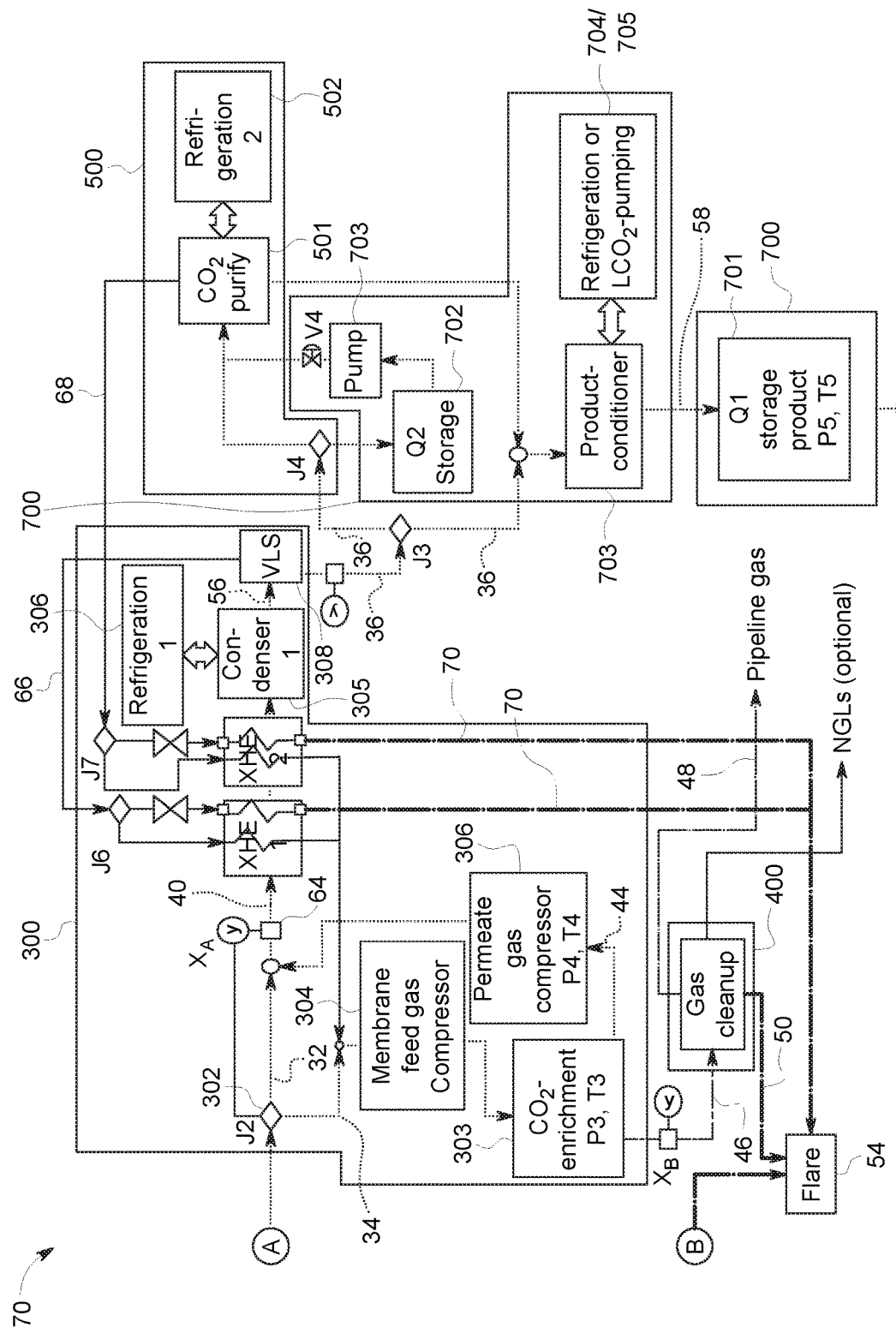
FIG. 6B is a continuation of the diagram of FIG. 6A illustrating an apparatus for flowback management and CO2-recovery of a low pressure post CO2-stimulation flowback stream, in accordance with one or more embodiments shown or described herein.
Figure 7A:
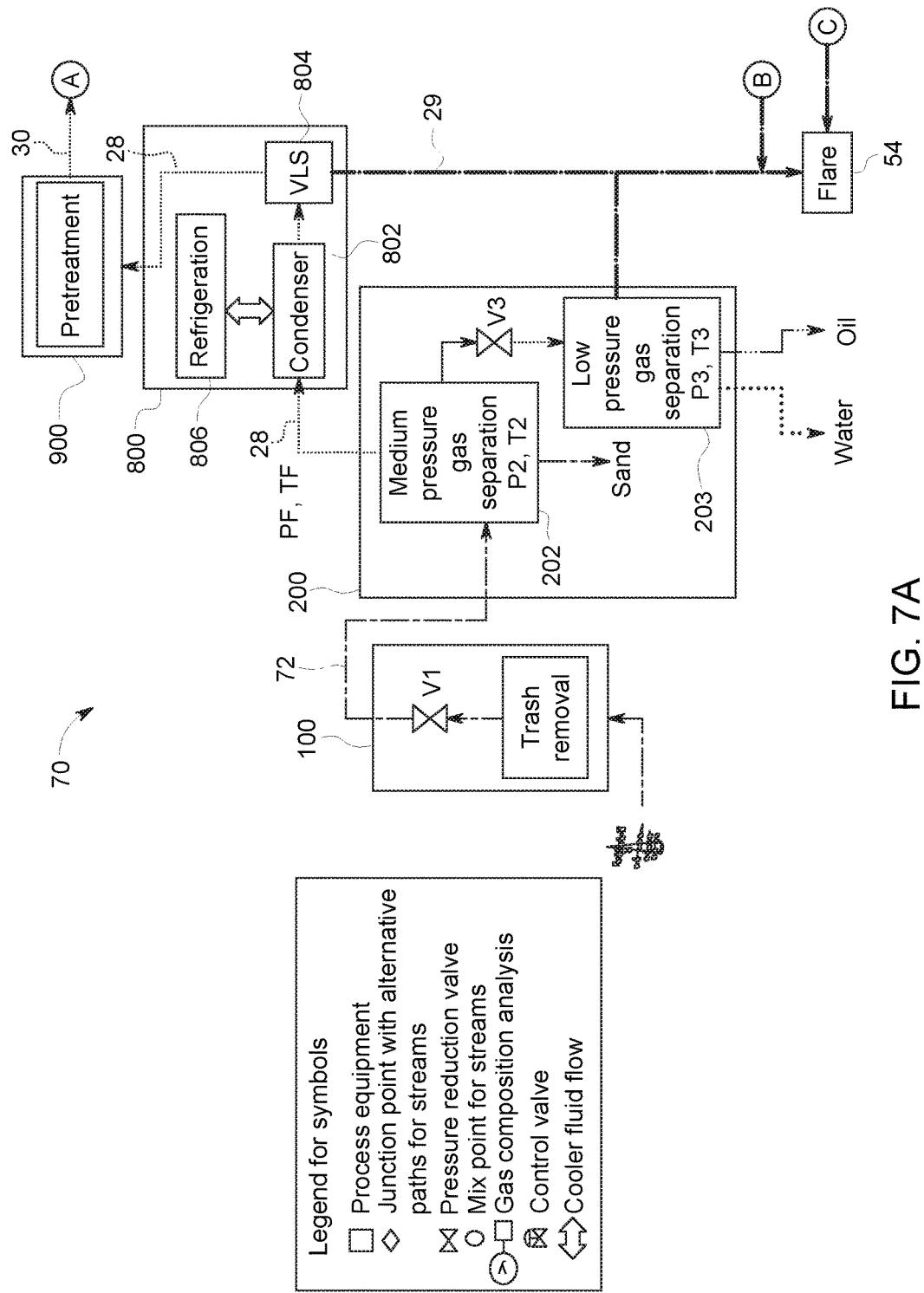
FIG. 7A is a detailed schematic diagram of an apparatus for flowback management and CO2-recovery of a post CO2-stimulation flowback stream including NGL recovery, in accordance with one or more embodiments shown or described herein.
Figure 7B:
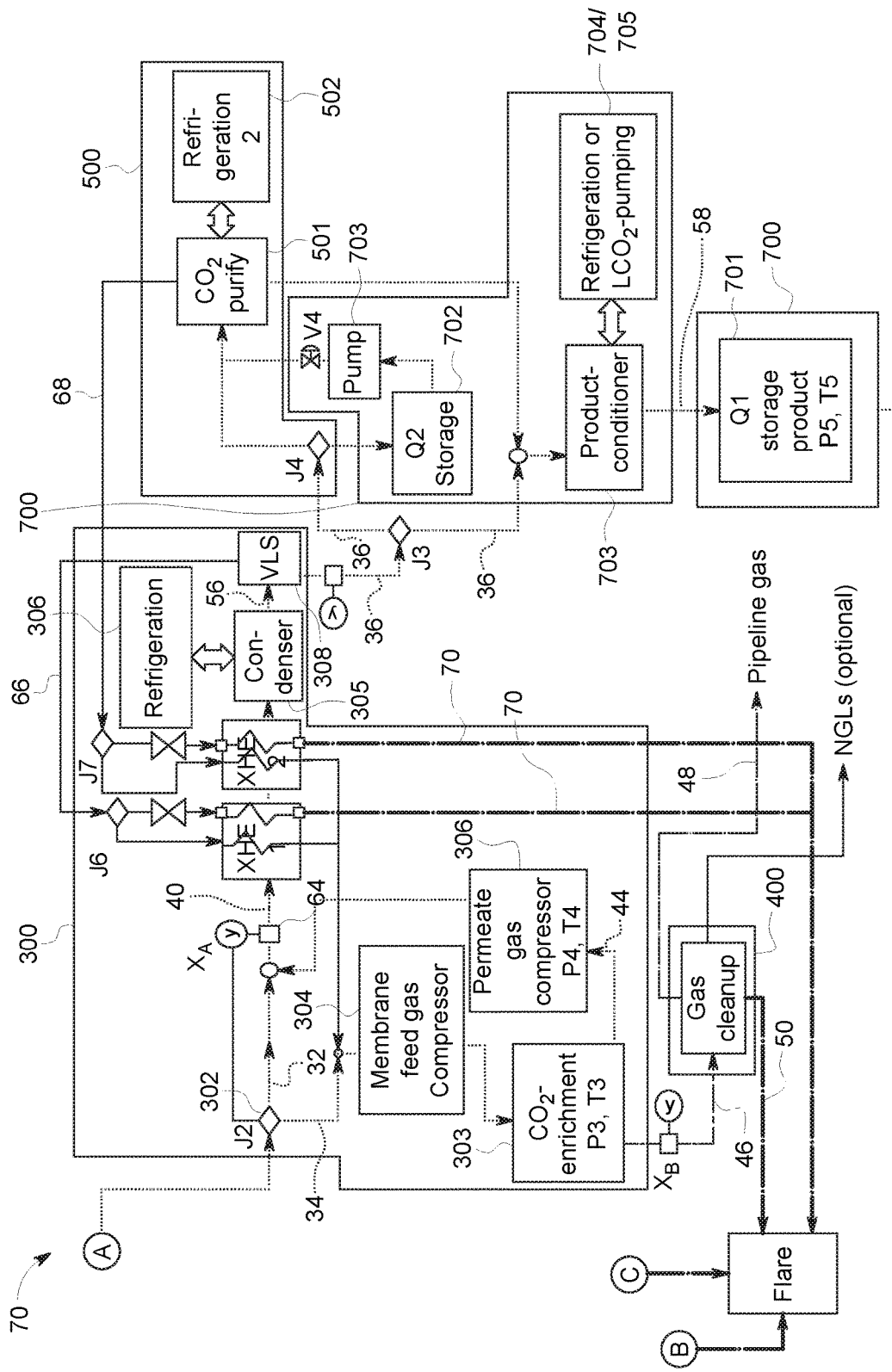
FIG. 7B is a continuation of the diagram of FIG. 7A illustrating an apparatus for flowback management and CO2-recovery of a post CO2-stimulation flowback stream including NGL recovery, in accordance with one or more embodiments shown or described herein.
Figure 8:
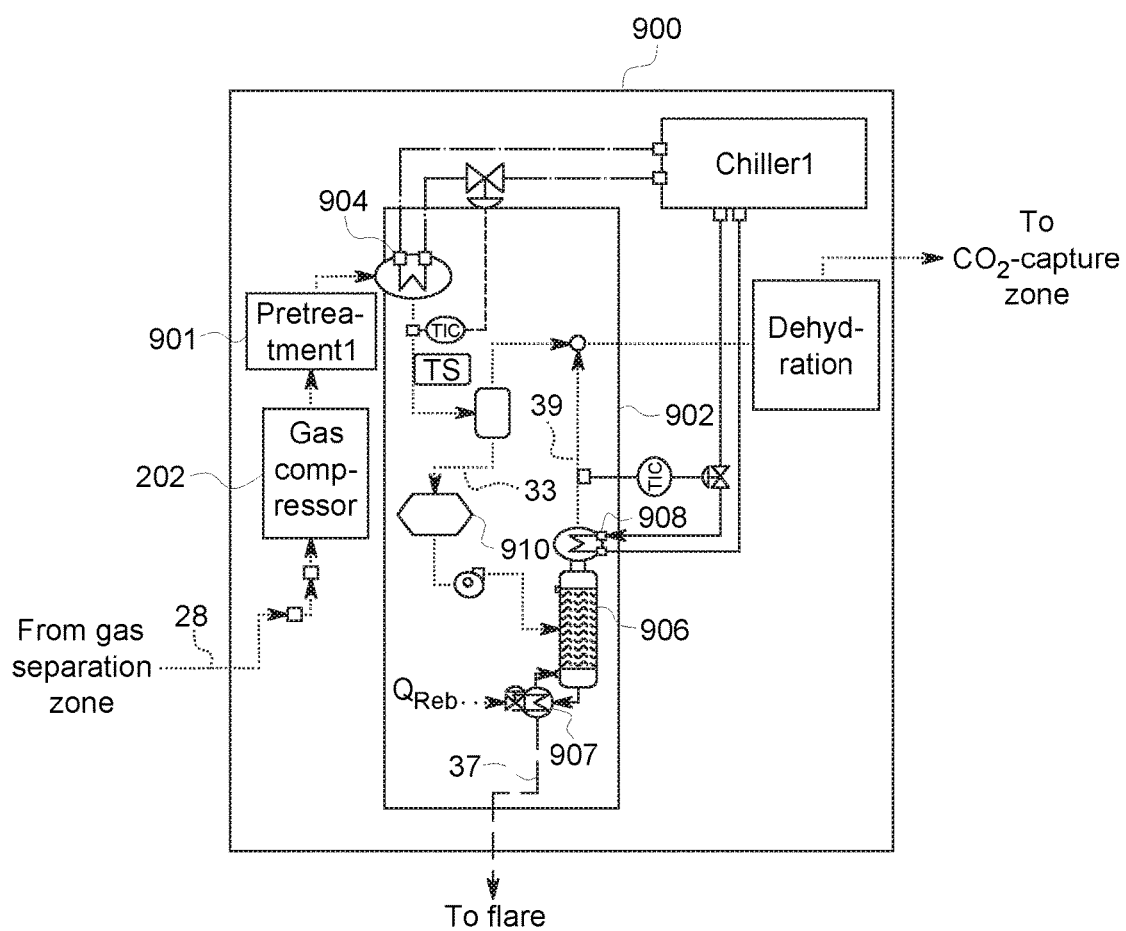
FIG. 8 is a detailed schematic diagram of a NGL recovery component for use in a flowback management and $CO_2$-recovery apparatus, in accordance with one or more embodiments shown or described herein.

Referring now to FIGS. 4-8, illustrated are a detailed schematic diagram of an apparatus for flowback management and $CO_2$-recovery of a high pressure post $CO_2$-stimulation flowback stream (FIG. 4) and an apparatus for flowback management and $CO_2$-recovery of a low pressure post $CO_2$-stimulation flowback stream (FIG. 5). In addition, illustrated in FIGS. 7 and 8 are two different concepts to achieve NGL removal in the disclosed apparatus. Referring more specifically to FIG. 4, illustrated is a flowback management and $CO_2$-recovery apparatus 60 for use with a high pressure post $CO_2$-stimulation flowback stream 62, generally similar to apparatus 10 of FIGS. 1-3. Accordingly, similar features to those of apparatus 10 will be similarly labeled. In this particular embodiment, the apparatus 60 is configured for use with the high pressure post $CO_2$-stimulation flowback stream 62, (also referred to herein as a flowback stream 62) such as a flowback stream having a pressure of 300~2000 psi.

A method of recovering $CO_2$ from a flowback after well-stimulation with $CO_2$-rich fluids, in keeping with the embodiment of FIG. 1 is described with reference to FIG. 4. The flowback stream 62 containing trash/oil/water/gas is first directed to a conventional trash removal screen in the flow control zone 100 that effectively removes large particles. The rate of the flowback stream 62 is then modified by a valve V1, such as a choke valve, to render a modified flowback stream 63. In an embodiment, the valve V1 is configured as a choke valve assembly with a plurality of valves arranged in a parallel circuit. Operation of valve V1 is a critical safety item during the flowback crew operations whereby manipulation of the valve V1 ensures that the casing-pressure near the work-over rig is below a set-point, typically 2,000 psig. In many instances, one or more of the valves that comprise the valve V1 become frequently plugged by sand, thus making it necessary to switch to a parallel valve. In many instances, this may lead to fluctuations in the line pressure downstream from the valve V1. In addition, the valve V1 may be manipulated to obtain a desired flow of the flowback stream 62 to ensure cleanout of the sand from the wellhead 18. The modified flowback stream 63 from valve V1 is input to the $CO_2$-capture process, and more particularly to the downstream processing zones.

A first step in the $CO_2$-capture process involves separation of the modified flowback stream 63, and more particularly, separation of the gas from the oil/water/sand. It is desired to obtain the gas at as high a pressure as possible for two reasons: (a) ability to condense the $CO_2$ at higher temperatures (e.g. 50° F. at 900 psig vs. 0° F. at 350 psig); and (b) ability to utilize smaller equipment sizes for separation vessels, membrane separation units, distillation, etc. In an embodiment, the high pressure post $CO_2$-stimulation flowback stream 62 is evolved at 300~350 psi, modified to render the modified flowback stream 63 and compressed in one or more compressors 210 in the gas separation zone 200 to approximately 900 psig to allow bulk condensation of $CO_2$ at ambient temperatures (e.g. >40° F.). The compressing of the modified flowback stream 63 and bulk condensation at these temperatures allows for use of refrigeration at higher evaporating fluid temperatures of the refrigerant used in the external refrigeration skid compared to bulk condensation of $CO_2$ at lower temperatures (e.g. 0° F. at 350 psig). Bulk condensation at these temperatures will allow a limited refrigeration system to be employed, as necessary, for product cooling. The advantage of conducting the condensation at a high pressure, such as 900 psig is that condensation may be achieved at >40° F. so that the practical liquid-leaving-temperature of the refrigeration system is >20° F. By contrast, performing the same condensation at 350 psig would require the condensing temperature of approximately 0° F. which would entail liquid-leaving-temperature of the refrigeration system to be around −20° F. Known refrigeration capacities of commercially-available trailer-mounted units decrease sharply as the liquid-leaving-temperature decreases. Thus, higher condensation temperatures entail lower capital equipment costs, lower footprint and lower energy costs. The offset is that the overall system cost, including the cost of gas compression to pressure PA, needs to be considered. Keeping pressures <Pc for $CO_2$ allows transition between gas to liquid $CO_2$ phases avoiding super-critical $CO_2$ transitions whose physical properties are difficult to predict for process control.

In the exemplary embodiment of FIG. 4, if the pressure of the flowback stream 62, and more particularly the modified flowback stream 63, is high, then the flow is directed at a junction point J1 to a high pressure gas separator 201 where the gas is flashed off the oil/water/sand mixture. In an embodiment, the high pressure gas separator 201 is a vertical vessel. In an embodiment, the modified flowback stream 63 has a pressure (P1) of greater than 900 psig and a temperature (T1) of greater than 86° F., the critical temp of $CO_2$, while undergoing gas separation within gas separator 201, thus enabling the $CO_2$ to be output as an output gas stream 26. The high pressure gas separator 201 provides an oil/water/sand/gas mixture stream 29 that is directed via a valve V2 to a medium pressure gas separator 202, which in an embodiment is a conventional horizontal separator operating at a pressure (P2) of 250-500 psig, and preferably approximately 350 psig and having a temperature (T2) of $T2 > T_{critical}$ $CO_2$.

If the modified flowback stream 63 from Valve V1 is lower than the desired P1, then the modified flowback stream 63 is directed to the medium pressure gas separator 202 at junction point J1. An output gas stream 26 from the medium pressure gas separator 202 is compressed in one or more compressors 210 and combined with the output gas 26 from the high pressure gas separator 201 to yield the flowback process stream 28 at a pressure PF.

The rate and composition of the $CO_2$ in the flowback process stream 28 will vary as a function of time. An example, by way of a graphical illustration 94, is shown in FIG. 5 in which a flowrate of the flowback process stream 28 (as indicated by a dashed line 96) varies from a maximum of approximately 14 MMSCFD to as low as 3 MMSCFD over a 3.5 day period. It was noted that the $CO_2$-concentration in the flowback process stream 28 changed from approximately 90% to approximately 70%. It is noted that there is a dynamic component to the rate profile that is greatly affected by the flowback crew operations associated with the $CO_2$-capture steps, such as millout, cleanout, production tubing install or simply stoppages/restarts or due to the well output itself. Also, it is noted that the flowback gas compositions and flowrates may vary significantly from well-to-well depending on the well characteristics and the flowback crew operation philosophy.

Referring again to FIG. 4, the flowback process stream 28 is output to the pretreatment zone 900 to remove contaminants when present, such as liquid droplets, solid particles, $H_2S$, and $H_2O$. The extent of $H_2O$ removal is determined by allowable $H_2O$ in the $CO_2$-product. For a $CO_2$-product at 350 psig/−10 F, the $H_2O$ specification may be as low as 2 ppmv, but if the $CO_2$-product that is stored and used at >1,200 psig, higher $H_2O$-content may be tolerated. The flowback process stream 28 is output subsequent to pretreatment, to the $CO_2$-capture zone 300 as the pretreated flowback process stream 30. As previously indicated, optional NGL removal (described presently) may be employed to remove NGL from the flowback process stream 28.

The flow splitter 302 at junction J2 within the $CO_2$-capture zone 300 receives the pretreated flowback process stream 30 from the pretreatment zone 900 and provides for the portion 32 of the pretreated flowback process stream 30 to flow to a condenser 305 and the portion 34 to flow to a $CO_2$-enricher 303.

A valve serving as the flow splitter 302 manipulates the extent of flow to the condenser 305 based on the gas composition of the combined, or mixed, gas stream at a point 64. More particularly, point 64 represents the point at which the split gas, and more particularly the portion 32 of the pretreated flowback gas stream 30, is mixed with the $CO_2$-rich permeate stream 44, and more specifically the enriched $CO_2$ stream 38, from the $CO_2$ enricher 303 and forms the combined, or mixed, gas stream 40. The criterion for the extent of split flow at point 64 may be decided based on a desired $CO_2$-concentration or an undesired component, for example a volatile component such as methane. For a flow splitter ratio (FSR)=$F_{Cond1}/F_{Gas}$ to equal 100% and may be varied for desired composition at point 64. An example conditions provides >=90% $CO_2$, <=5% C1. The criterion for the extent of flow split at the flow splitter 302 may also be determined based on concentration at a point just upstream from a junction J3 (presently described).

The combined, or mixed, gas stream 40 is next cooled via the condenser 305 via an external refrigeration system 306 using a glycol/water mixture or other heat-transfer fluid. A substantial portion of the $CO_2$ is condensed into the liquid phase. The advantage of conducting the condensation at a high pressure, such as 900 psig is that this condensation step may be achieved at >40° F. so that the practical liquid-leaving-temperature of the refrigeration system 306 is >20° F. By contrast, performing the same condensation at 350 psig would require the condensing temperature of approximately 0° F. which would entail a liquid-leaving-temperature of the refrigeration system 306 to be around −20° F. The refrigeration capacities of commercially-available trailer-mounted units decrease sharply as the liquid-leaving-temperature decreases. Thus, higher condensation temperatures entail lower capital equipment costs, lower footprint, and lower energy costs. The combined, or mixed, gas stream 40 is output from the condenser 305 as the Quality2 $CO_2$-output stream 36.

The condenser 305 may be operated to yield either total condensation of the combined, or mixed, gas stream 40 or a partial condensation. To this extent, additional key processes may take place within the $CO_2$-capture zone 300 including, but not limited to, stabilization of the Quality2-output stream 36 via a post-condenser vapor-liquid separator (VLS) 308. The VLS 308 provides an opportunity to separate volatiles from the Quality2 $CO_2$-stream 36 exiting the condenser 305 at a high pressure (e.g. 900 psig). In an embodiment in which only partial condensation is achieved in condenser 305, the partially condensed combined, or mixed, gas stream 40, exiting the condenser 305 as a vapor-liquid stream 56 undergoes separation in the VLS 308 to yield the Quality2 $CO_2$-stream 36 and a VLS vapor stream 66. Thus, the VLS 308 provides a means for removal of undesired volatiles from the partially condensed combined, or mixed, gas stream 40, especially as the $CO_2$ content in the flowback gas stream 62 decreases and the C1 or other volatile-component increases.

At junction J3, if the Quality2 $CO_2$-stream 36 meets predetermined $CO_2$-product specifications, then it is isolated in the storage zone 700. The state of the $CO_2$-rich liquid, and more particularly the Quality2 $CO_2$-stream 36, at J3, is based on the conditions in the VLS 308. In a product-conditioning step, the state of the Quality2 $CO_2$-stream 36 may be further modified in a conditioner 704 to meet the $CO_2$-product specifications. For example, if the desired storage/transport conditions are 350 psig/−10° F. then the product-conditioning step may include pressure-reduction or -increase, as necessary and further cooling via a refrigeration system 706, if necessary, to reduce volatilization during storage/transport/use due to ambient heat incursions into the one or more Quality1 $CO_2$-storage tanks 701 and/or during transfer to a reuse site. If the desired storage/transport conditions are >1,200 psig/ambient then this step may include a liquid pump 708 to raise the pressure and/or provide further cooling, as necessary. Alternatively, if the Quality2 $CO_2$-stream 36 meets predetermined $CO_2$-product specifications without the need for further processing, such as product-conditioning, pressure reduction or increase, it may be sent directly to the $CO_2$-transfer zone 600 (FIG. 1) to provide transfer as the Quality1 $CO_2$-product stream 58 for product end use.

If the concentration of the Quality2 $CO_2$-stream 36 at J3 does not meet the $CO_2$-product specifications then it is directed to the purification zone 500 for further processing. The contaminants in the Quality2 $CO_2$-stream 36 of interest are the volatiles which are removed in the purification zone 500. The purification zone 500 may provide a simple volatilization step using heat and/or decreased pressure or preferably a distillation column as the purifier 501. For stable operation of distillation columns it is necessary to control the flowrate and composition within a desired range. To achieve such control, junction J4 provides a means to divert all or some of the Quality2 $CO_2$-stream 36 to the one or more Quality2 $CO_2$-storage tanks 702, which are essentially one or more vessels for intermediate storage of the Quality2 $CO_2$-stream 36. The feed to the purifier 501 can thus be controlled via a pump 710 and a valve V4.

The purifier 501 may be operated in a partial-condenser mode and thus the vapor exiting will be enriched in the volatiles, e.g. Cl. The extent of $CO_2$-loss in this vapor will depend on the pressure and temperature conditions in the partial condenser. For example, at 350 psig/−20° F. condenser conditions may yield approximately 58% $CO_2$ in the vapor, whereas 900 psig/−20° F. condenser conditions may yield approximately 35% $CO_2$ in the vapor. Correspondingly, where a reboiler (not shown) is included within the purification zone 500, the reboiler conditions may depend on the extent of Cl stripping desired and the operating pressure. For example, for desired <1% Cl, the reboiler temperatures may be approximately 6° F. and 75° F. for 350 psig and 900 psig, respectively. Alternatively, the $CO_2$-product specifications may define the end $CO_2$-product in terms of a bubble point specification at a certain pressure, e.g. 0° F. at 350 psig. In this case, the reboiler pressure and temperature conditions are modified in order to meet these requirements.

The purifier 501 operating conditions may also be chosen for optimal energy usage. For example, if the $CO_2$-product specifications desire the $CO_2$-product at 350 psig/−10° F. then it is optimal to run the purifier 501, and more particularly an included distillation column, at approximately 350 psig, however, if the desired product is at >1,200 psig then it is desirable to operate the column at higher pressure.

A plurality of output streams from the VLS 308, as a VLS vapor stream 66, and the purifier 501, as a distillate vapor stream 68, may be sent for further $CO_2$-recovery in the $CO_2$-capture zone 300. Alternatively, if the VLS vapor stream 66 and the distillate vapor stream 68 are of low-value, they may be wasted as low-value waste streams 69 and sent to the flare 54. Thus, junction points J6 and J7 represent locations where the VLS-vapor stream 66 and the distillate vapor stream 68 are directed to the flare 54 or to the $CO_2$-capture zone 300. For energy efficiency, these low-value waste streams 69 may be expanded via through a valve (not shown) utilizing Joule-Thomson (JT) cooling, that will cool the low-value waste streams 69 and provide cooling of the combined, or mixed, gas stream 40 prior to it reaching the condenser 305. Alternatively, the heat exchange may be with any of the other streams in the process, for example, the feed stream, and more particularly the Quality2 $CO_2$-stream 36, to the purification zone 500.

In an embodiment, the portion 34 of the pretreated flowback process stream 30 diverted by the flow splitter 302 at junction J2 may be mixed with the VLS-vapor stream 66 and the distillate-vapor stream 68 and fed to the enricher 303. Junction J5 represents the location where the distillate vapor 68 is directed to the compressor 304, if necessary. As an example, the combined, or mixed, gas stream 40 may be at 900 psig but the purifier 501 may be operated (due to optimal energy usage criteria) at 350 psig. The mixed gas entering the enricher 303 and/or compressor 304 may be conditioned to desired temperature that is optimal for membrane gas separator operation. In an embodiment, a polymeric membrane that is selectively permeable to $CO_2$- relative to the hydrocarbon gas components may be used in the enricher 303. Gas permeation occurs due to a partial pressure gradient for the components across the membrane. The use of such membrane results in the $CO_2$-rich permeate 44 that is enriched in $CO_2$ and the $CO_2$-lean gas retentate (non-permeate) stream 46 that is depleted in $CO_2$. For example, typical $P_{feed}/P_{permeate}$ conditions are 900 psig/100 psig, 350 psig/30 psig, 1100 psig/350 psig. Higher pressure drops result in higher permeation rates and consequently less membrane area for the same $CO_2$-recovery. However, lower values of the permeate-side pressure $P_{permeate}$ also entail higher equipment and energy costs for the gas compressor 306 needed to increase the permeate gas pressure to that at point 64. Other constraints may limit the choices of feed- and permeate-side pressures. For example, a constraint could be the maximum pressure difference between the feed-side and permeate-side of the membrane channel that is permissible from membrane stability considerations, for example burst pressure of the manufactured membrane. Another example could be the plasticization of the membrane material with increased pressure due to dissolved $CO_2$ or hydrocarbons that may limit $CO_2$-enrichment performance or membrane service-life.

In addition, due to the permeation process and loss of pressure of the permeating components, the temperature decreases inside the membrane module which may lead to condensation of higher-boiling components on the retentate side (higher P side) of the membrane. Polymeric materials suitable for this membrane separation include PEEK, cellulose acetate, and polyimides. The membrane may be in the form of hollow-fiber bundles or spiral-wound modules. However, because of potential condensation of the NGLs in the gas streams, use of membranes that will not be physically blocked by the condensed liquid are required. Hence, hollow fibers are more suited than spiral wound modules. In addition, membrane materials that are stable to liquid hydrocarbons are required. PEEK membranes characterized for NGLs condensation conditions have been found to be stable for these purposes.

Referring more particularly to the $CO_2$-lean gas retentate (non-permeate) stream 46 output from the enricher 303 toward the gas cleanup zone 400, a concentration $X_B$ represents the extent of $CO_2$-recovery from the portion 34 of the pretreated flowback process stream 30 entering the enricher 303. While low values of $X_B$ for % $CO_2$ entail higher $CO_2$-recovery into the $CO_2$-rich-permeate stream 44, this also represents a lower permeate $CO_2$-concentration (and higher Cl-concentration) that lowers the $CO_2$-concentration of the combined, or mixed, gas stream 40 entering the condenser 305 which entails more recycled $CO_2$-containing vapor streams from the VLS 308 (such as vapor stream 66) or the purification zone 500 (such as distillate vapor stream 68). From a design perspective, requiring low values of $X_B$ entails need for a higher membrane area in the enricher 303. Thus, $X_B$ represents a process parameter that may be used as an optimizing parameter for the $CO_2$-capture process.

The point at which the $CO_2$-lean gas retentate (non-permeate) stream 46 is output from the enricher 303 also represents the end of the $CO_2$-recovery section, and more particularly the $CO_2$-capture zone 300. The $CO_2$-lean gas retentate (non-permeate) stream 46 from the enricher 303 is directed to the gas cleanup zone 400. In the gas cleanup zone 400, which may be serviced by commercially-available membrane processes, the permeate-side is typically operated at very low pressures, for example 5 to 30 psig, to output a gas stream, and more particularly a $CO_2$ rich-permeate stream 50 having a low amount of $CO_2$ and hence may be flared as a flare gas via a flare 54, used as a fuel for on-site power generation, or returned to the low pressure gas compressor 213 for further processing.

Referring more specifically to FIG. 6, illustrated is a flowback management and $CO_2$-recovery apparatus 70 for use with a low-pressure post $CO_2$-stimulation flowback stream 72 (also referred to herein as a flowback stream 72), generally similar to apparatus 10 of FIGS. 1-3 and apparatus 60 of FIG. 4. Accordingly, similar features to those of apparatus 10 and 60 will be similarly labeled. In this particular embodiment, the apparatus 70 is configured for use with the low-pressure post $CO_2$-stimulation flowback stream 72, such as a flowback stream having a pressure of ~350 psi. In this particular embodiment, in contrast to apparatus 60, the low-pressure post $CO_2$-stimulation flowback stream 72, evolved at 300-350 psi, does not undergo compression in a compressor, such as compressor 210 (FIG. 4) in the gas separation zone 200. The only compression in apparatus 70 takes place within the $CO_2$-capture zone 300.

In the exemplary embodiment of FIG. 6, the flowback stream 72 has an initial pressure of ~350 psig, and more particularly at a pressure of the medium pressure gas separator 202. The flowback stream 72 has a pressure (P2) between 300-500 psig while undergoing gas separation within the medium pressure gas separator 202. A flowback process stream 28 output from the medium pressure gas separator 202 has a pressure (PF) of approximately 350 psig. The flowback process stream 28 flows to the pretreatment zone 900, prior to being directed as a pretreated flowback process stream 30 to the $CO_2$-capture zone 300. The flow splitter 302 within the $CO_2$-capture zone 300 provides for directing of a portion 34 of the pretreated flowback process stream 30 to the enricher 303 for $CO_2$-enrichment. A valve serving as the flow splitter 302 provides for a flow splitter ratio (FSR)=$F_{Cond1}/F_{Gas}$=100% and may be varied for desired composition at point 64. In contrast to the high pressure apparatus 60 of FIG. 4, condensation in condenser 305 of apparatus 70 takes place at 350 psig/0° F. in order to condense the liquid $CO_2$ at point upstream and proximate the junction J3. For efficient enricher 303 operation it is preferred to compress the portion 34 of the pretreated flowback process stream 30 to a higher pressure $P_{feed}$. Typical combinations of $P_{feed}/P_{permeate}$ include 350 psig/30 psig, 900 psig/100 psig, 1100 psig/350 psig. The Quality1 $CO_2$-product stream 58 is stored within the storage tank 701 at a pressure and temperature (P5, T5) of P5/T5=350 psig/−10° F.

Optimal $CO_2$-capture from the flowback streams 62, 72 of FIGS. 4 and 6 is based on CAPEX, OPEX, footprint, utilities (power, refrigeration), operability at well-site, emissions regulations and value of recovered-$CO_2$. One key parameter may include the ability to modify splitting of the flow stream by way of the flow splitter 302 based on the rate and pressure of the initial flowback stream and the $CO_2$-concentration contained therein.

As previously mentioned, illustrated in FIGS. 7 and 8 are two alternative configurations to achieve optional NGL removal in the flowback management and $CO_2$-recovery apparatus disclosed herein. Motivation to include such NGL removal components includes the possible accumulation of NGL in the $CO_2$-product, and more specifically, in the Quality1 $CO_2$-product stream 58. In an embodiment, NGL fractions may not be acceptable for the end-use applications due to the following: (i) fracturing reuse application specifications may limit NGLs due to pumpability, handling, emissions requirements; (ii) $CO_2$-pipeline specifications imposed by midstream companies may limit NGLs due to the $CO_2$-pipelines serving multiple applications in the oil and gas space, e.g. EOR besides fracturing; (iii) flammability concerns during storage/transportation, however, this may not be an issue if $CO_2$>80%; and/or (iv) emissions concerns, especially for BTEX components, during storage/transportation/handling. Additional motivation for NGL removal is concern that NGLs may condense in downstream process unit operations. Gas-separation membrane vendors have noted degradation in membrane performance if liquids condense on the membranes and thus limit or prohibit condensation inside the membrane modules. Finally, NGL removal may be based on the amount of NGLs in the flowback gas during the flowback period. If the amount of NGLs in the flowback gas is of an insignificant amount and thus insignificant value, recovery may not be warranted and any NGLs may be flared or if possible used for power generation.

Removal of NGLs from the flowback gas may be achieved via known cooling processes that condense the NGLs. In this process, the gas is cooled to a temperature wherein the higher boiling components condense and are separated in a vapor-liquid separator (VLS) equipment. The colder the condensing temperature, the higher the NGL removal. However, when this process step is employed in the herein disclosed $CO_2$-capture process, the cooling step to condense the NGLs may cause some amount of $CO_2$ to also condense, which represents a loss of $CO_2$.

To minimize $CO_2$ losses, disclosed are two concepts for use in the apparatus for flowback management and $CO_2$-recovery disclosed herein. Referring more specifically to FIG. 7, illustrated is a first embodiment, wherein an included NGL removal zone 800 includes a condenser 802, a VLS 804 and refrigeration component 806. As illustrated, the condenser 802 and VLS 804 provide for condensing out of the NGLs and separation of the flowback process stream 28 into a vapor stream 31 directed to the flare 54 and a liquid stream 28a, directed to the pretreatment zone 900. In this particular NGL removal concept, the effect of stream pressure on the sensitivity of $CO_2$-loss while condensing out the NGLs is of particular relevance. Gas pressures in the range of 250 to 400 psig have been found as the optimal conditions for NGLs removal without significant loss of $CO_2$ and reasonable refrigeration cost/footprint. When gas pressure is high, e.g. 900 psig, the NGLs condensing temperature would be high in the range 50° F. to 100° F. which is desirable from a refrigeration-duty and footprint perspective. However, colder temperatures result in greater $CO_2$ loss in the condensed NGL phase; for an example flowback gas composition containing 70% $CO_2$ and 5% C4+ components, the condensing temperature to obtain >70% removal of C5+ components is ~65° F. which results in approximately 15% of the $CO_2$ in the flowback gas is lost with the condensed NGLs. By contrast, if the gas pressure is 350 psig, the condensing temperature although lower at ~40° F., the extent of $CO_2$-loss is <1%. While lower gas pressures e.g. 100 psig would entail the need for low temperatures in the range of 0° F. to condense the NGLs, which increases refrigeration costs and footprint. Hence, gas pressures in the range of 250 to 400 psig are the optimal conditions for NGLs removal without significant loss of $CO_2$ and reasonable refrigeration cost/footprint.

Referring now to FIG. 8, illustrated is a second embodiment of a means for removal of NGLs, and more particularly a portion of the pretreatment zone 900 including a NGL removal component 902. The NGL removal component 902 includes a condenser 904 and a distillation column 906. As illustrated, the condenser 904 provides for condensing out of the NGLs when the gas pressure is high, e.g. 900 psig and recovering the $CO_2$ from the condensed NGLs to increase overall $CO_2$-capture while reducing the NGLs in the final $CO_2$-product. A condensed NGLs stream 33 (crude NGLs) is sent to the distillation column 906 equipped with a reboiler 907 and optionally an overhead partial condenser 908. The conditions of the reboiler 907 are chosen (e.g. 150°

F. to 200° F. at 900 psig) to reduce $CO_2$ loss in the NGLs. A bottoms NGLs-rich stream 37 may be sent to flare 54 (FIG. 4) and flared or used as for power generation, and a top vapor stream 39 is directed to the $CO_2$-capture section 300. If the amount of NGLs in the flowback stream (i.e. flowback stream 62, 72) is small then the condensed crude NGL stream 33 (with $CO_2$) may be stored in a storage component 910 and the distillation column 906 used on an as-needed basis.

In an embodiment, the distillation column 906 may be equipped with the overhead partial condenser 908 to control the temperature thereby limiting the NGLs carryover in the top vapor stream 39. In this case temperature of the reboiler 907 may be chosen to drive off the $CO_2$ to yield the bottom NGLs-rich stream 37 having a low $CO_2$ concentration and hence has some economic value while the overhead condenser 908 temperature is chosen to reduce NGLs carryover to the $CO_2$-capture zone 300.

Figure 9:
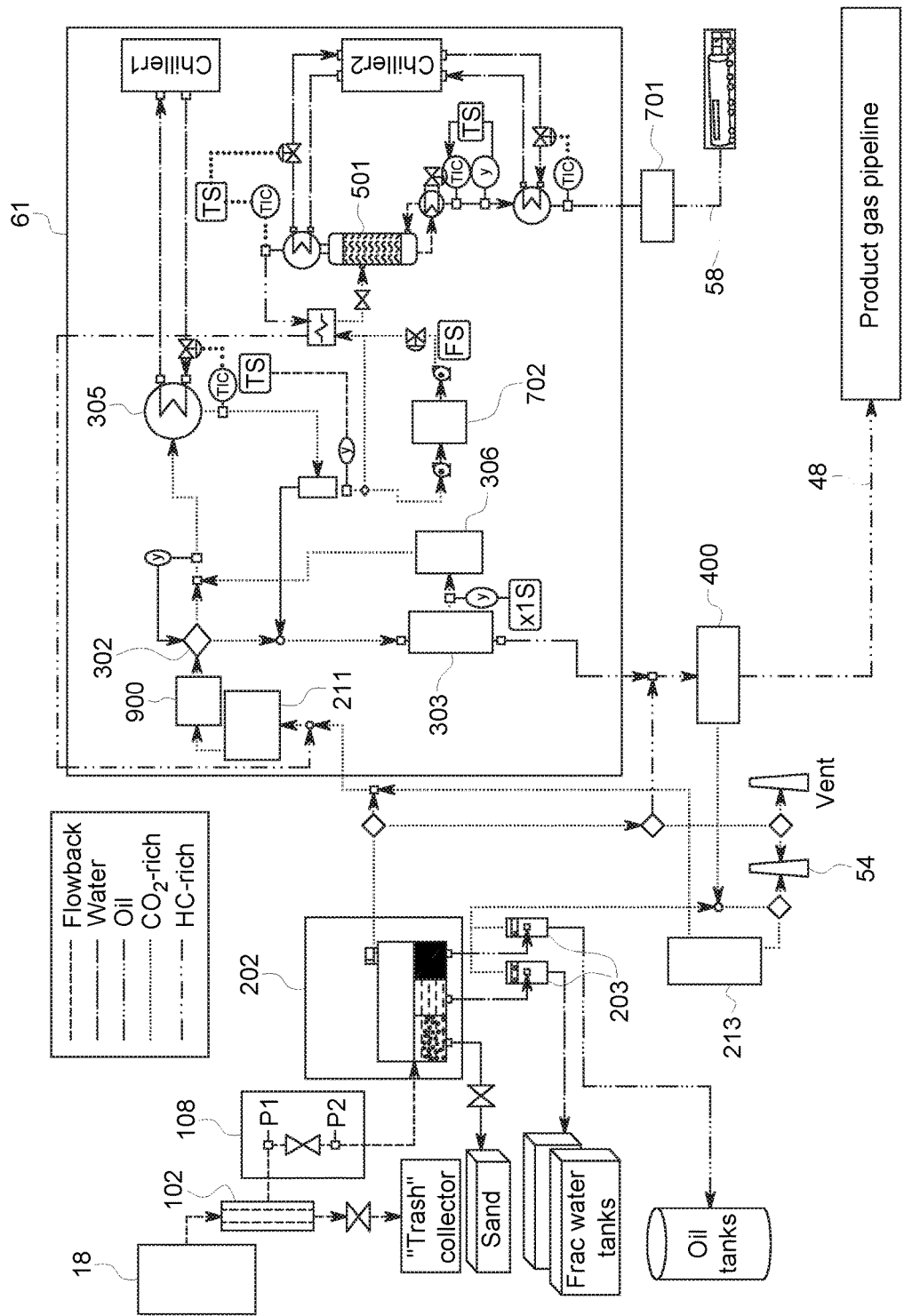
FIG. 9 is a further detailed schematic diagram illustrating an implementation of the apparatus for flowback management and $CO_2$-recovery of FIG. 4, in accordance with one or more embodiments shown or described herein.

Referring now to FIGS. 9-12, illustrated are further detailed schematic diagrams illustrating four implementations of the apparatus 60 for flowback management and $CO_2$-recovery of FIG. 4. The portion of each figure that specifically pertains to the $CO_2$-recovery process is indicated by shaded portion 61. Referring more specifically to FIG. 9, illustrated is a first implementation of the high pressure apparatus 60 of FIG. 4. Illustrated in further detail in FIG. 9 are flow pressures and temperatures of the flowback stream 62 through the apparatus 60

Figure 10:
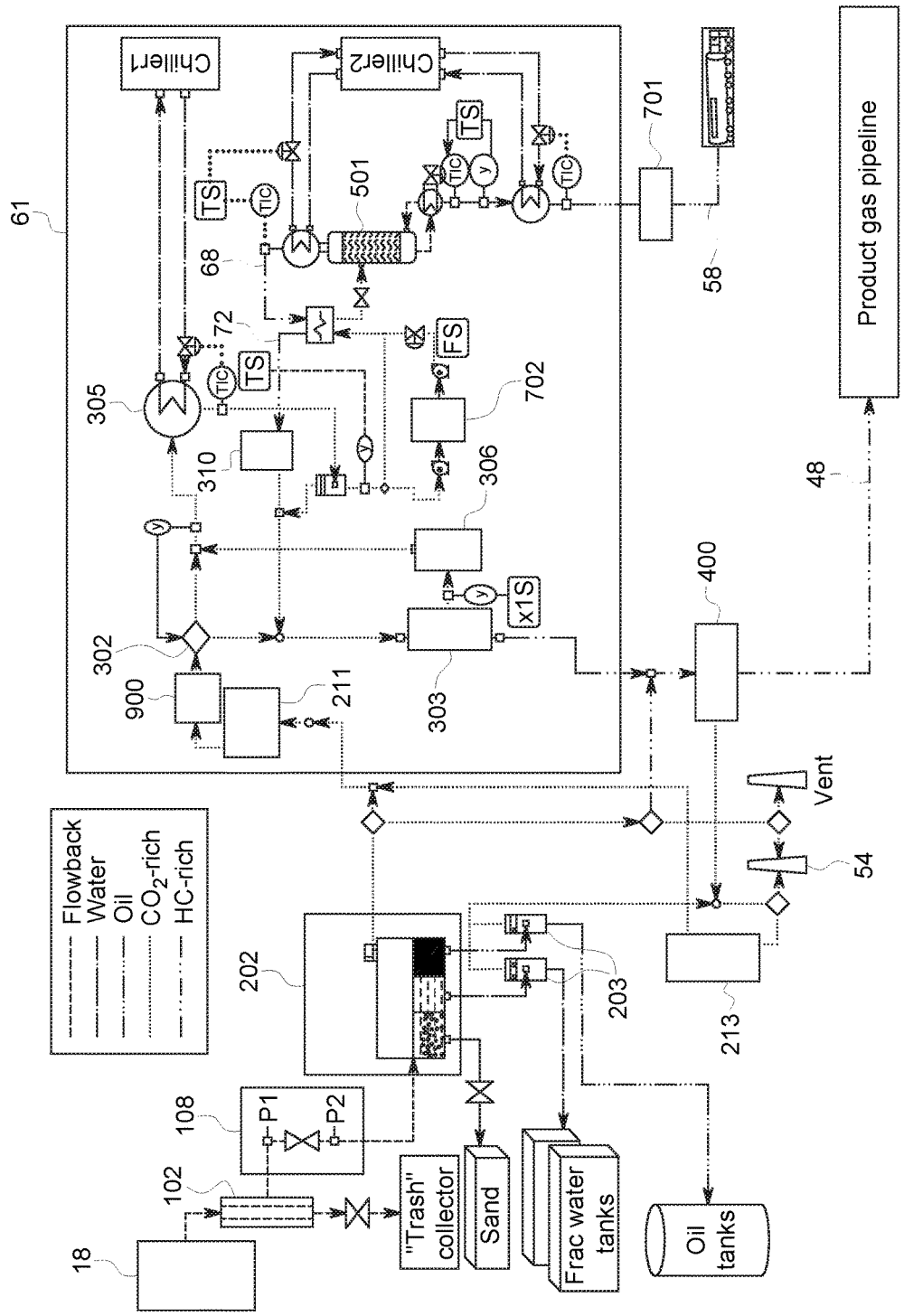
FIG. 10 is a further detailed schematic diagram illustrating an alternate implementation of the apparatus for flowback management and $CO_2$-recovery of FIG. 4, in accordance with one or more embodiments shown or described herein.

Referring now to FIG. 10, illustrated is a second implementation of the high pressure apparatus 60 of FIG. 4. Illustrated in further detail in FIG. 10 are flow pressures and temperatures of the flowback stream 62 through the apparatus 60. In contrast to the implementation of FIG. 4, in this particular configuration overhead vapors from the purifier 501, such as a distillation column, in the form of a distillate vapor stream 68 (e.g. 58% $CO_2$ at 350 psig column pressure, −20° F.), after heat recuperation, are compressed via a dedicated compressor 310 and sent to the enricher 301 for $CO_2$-enrichment. This avoids the dilution of the $CO_2$-concentration in portion 32 of the pretreated flowback process stream 30 fed to the flow splitter 302 and thus improves efficiency in terms of lower energy and membrane area required. The offset is the requirement of the additional compressor costs.

Figure 11:
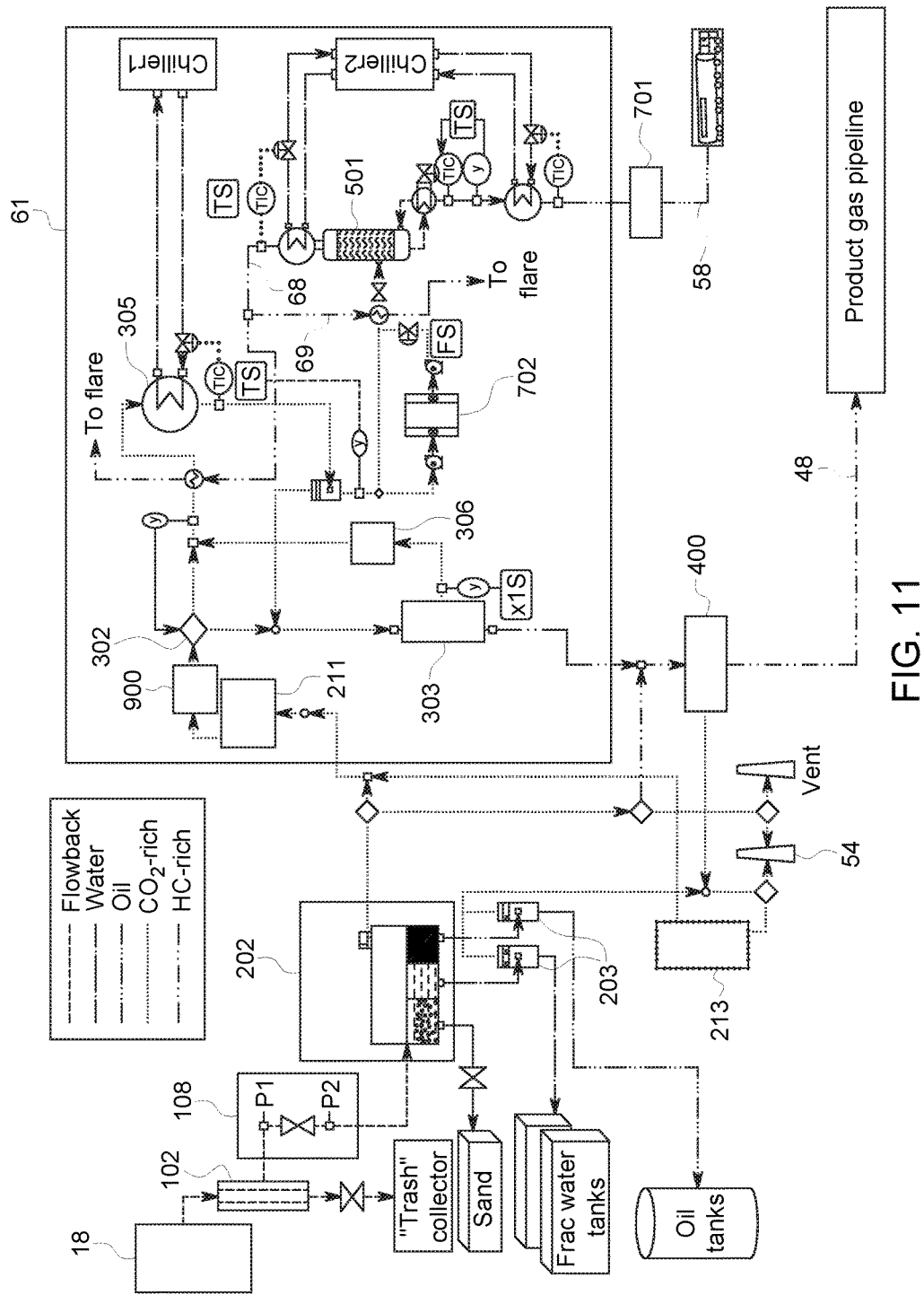
FIG. 11 is a further detailed schematic diagram illustrating an alternate implementation of the apparatus for flowback management and $CO_2$-recovery of FIG. 4, in accordance with one or more embodiments shown or described herein.

Referring now to FIG. 11, illustrated is a third implementation of the high pressure apparatus 60 of FIG. 4. Illustrated in further detail in FIG. 11 are flow pressures and temperatures of the flowback stream 62 through the apparatus 60. In contrast to the implementation of FIG. 4, in this particular configuration at least a portion of the overhead vapors, and more particularly a portion of the distillate vapor stream 68 from the purifier 501, such as from a stabilization column (from partial condenser) (e.g. 58% $CO_2$ at 350 psig column pressure, −20 F), are sent to waste (flared) as a low-value waste stream 69, after heat recuperation. While this wasting reduces overall $CO_2$-recovery, based on the Quality2 $CO_2$-stream 36 concentration and the purifier 501 operating conditions, this loss may be small while providing more efficiency in terms of energy, capital costs and footprint relative to the previously described configurations, in that it avoids the dilution of the flowback gas stream 62. In an alternate embodiment, whereby the flow splitter 302 provides for 100% of the pretreated flowback process stream 30 to be directed to the condenser 305 and an enricher, such as enricher 303, is not included, the distillate vapor stream 68 from the purifier 501 may be directed to the gas cleanup zone 400.

Figure 12:
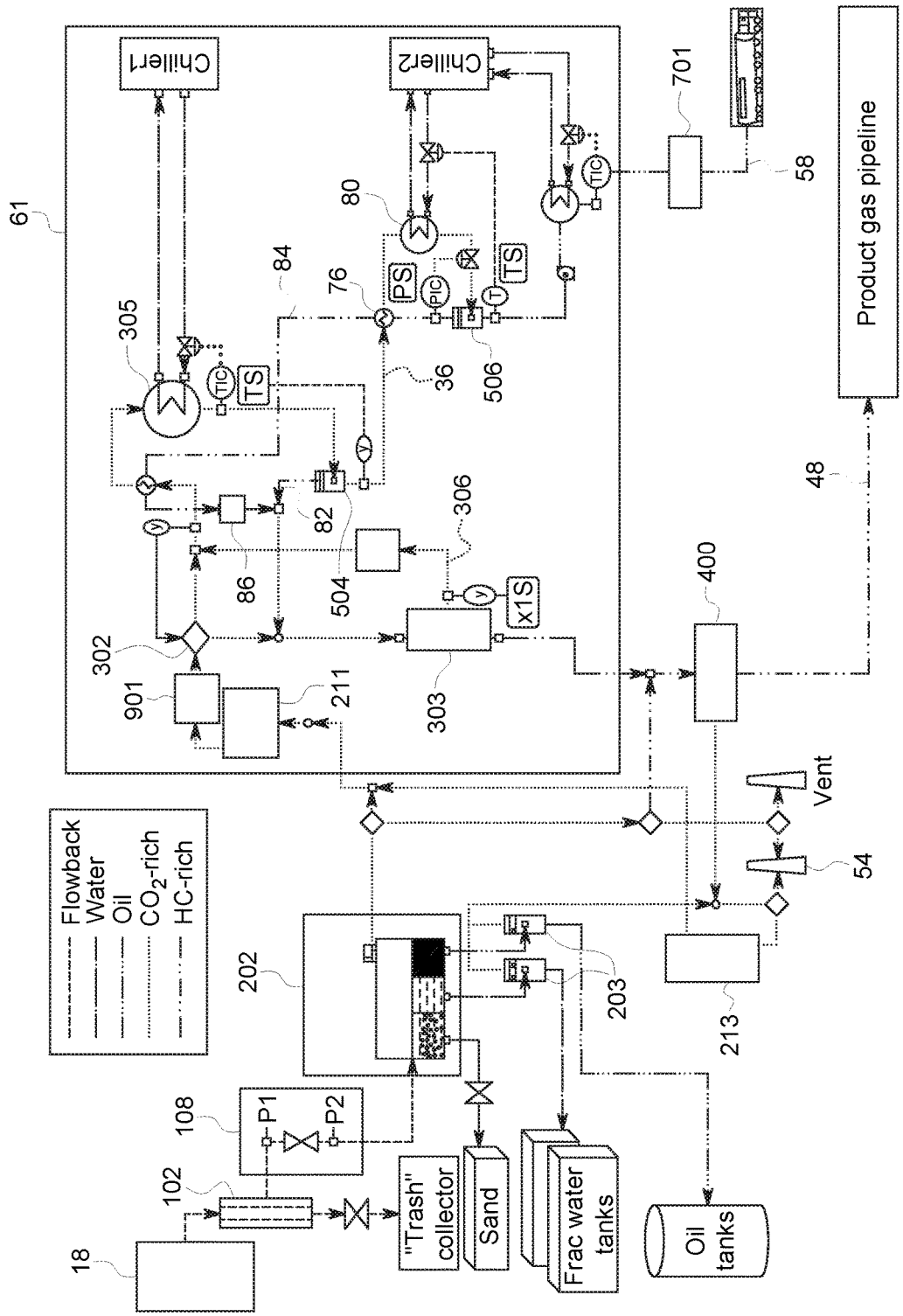
FIG. 12 is a further detailed schematic diagram illustrating an alternate implementation of the apparatus for flowback management and $CO_2$-recovery of FIG. 4, in accordance with one or more embodiments shown or described herein.

Referring now to FIG. 12, illustrated is a fourth implementation of the high pressure apparatus 60 of FIG. 4. Illustrated in further detail in FIG. 12 are flow pressures and temperatures of the flowback stream 62 through the apparatus 60. In contrast to the implementation of FIG. 4, in this particular configuration, the Quality1 $CO_2$-product stream 58 is achieved in the $CO_2$-purification zone 500 with one or more vapor-liquid separators (VLSs) 504, 506, in lieu of the previously described stabilization/distillation process. Furthermore, storage for the Quality2 $CO_2$-stream 36 is not provided, such as previously provided in the one or more Quality2 $CO_2$-storage tanks 702 (FIG. 3). In this particular embodiment, the Quality2 $CO_2$-stream 36 from the VLS 504 is expanded through a valve 76, utilizing Joule-Thomson (JT) cooling, and directed to the VLS 506. The pressure and temperature conditions in the VLS 506 are chosen so that the liquid from VLS 506 is of the desired $CO_2$-stream quality (for example, the bubble point at VLS 506 pressure would correspond to the $CO_2$-product composition specification for volatiles in the Quality1 $CO_2$-product stream 58. In order to achieve the desired temperature and enrichment of $CO_2$ in the liquid in VLS 506, some volatilization in the VLS 506 should occur upon expansion. The extent of this volatilization depends on the composition of the Quality2 $CO_2$-stream 36 output from the VLS 504 the change in pressure ($\Delta P$) and desired change in temperature ($\Delta T$). An interchanger 80 provides a means for controlling the temperature in the VLS 506. The concentration of $CO_2$-product is measured and used to control the temperature and pressure conditions in the VLS 506. The concentration of the Quality2 $CO_2$-stream 36 output from the VLS 504 is measured and used to control the temperature set-point in the condensor 305. A vapor flow stream 82 from VLS 504 (if any) is directed to the enricher 303. A vapor flow stream 84 from the VLS 506 is sent after heat-exchange to the enricher 303 via a compressor 86. A liquid pump may be provided, if necessary, to boost the pressure of the Quality1 $CO_2$-product stream 58. The Quality1 $CO_2$-product stream 58 may be further cooled to provide sub-cooling, below the bubble point, to avoid vapor losses during storage/transport of the Quality1 $CO_2$-product stream 58 at for example 350 psig/−10 F.

Figure 13:
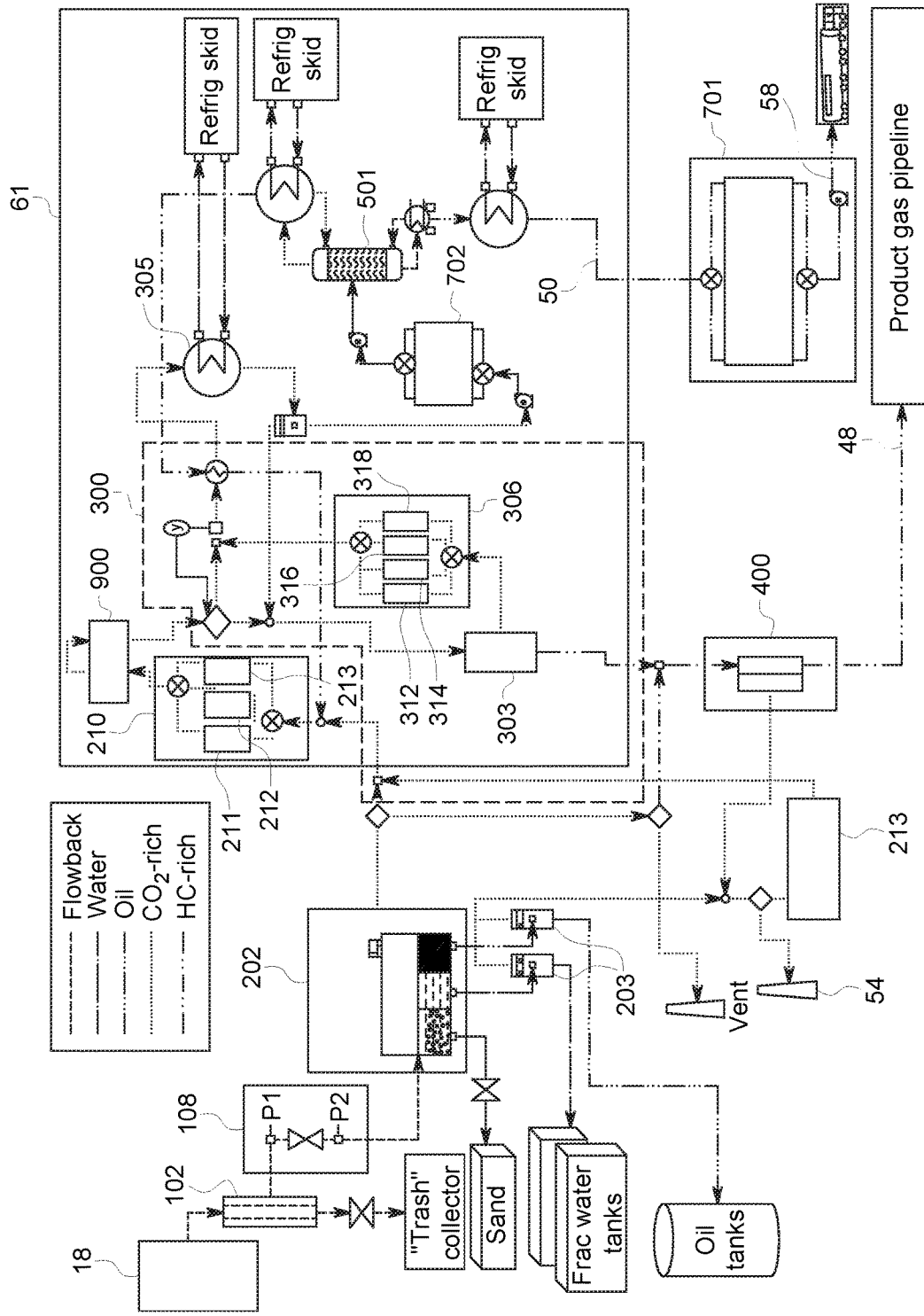
FIG. 13 is a further detailed schematic diagram of a modified apparatus for the implementation of FIG. 10, in accordance with one or more embodiments shown or described herein.
Figure 14:
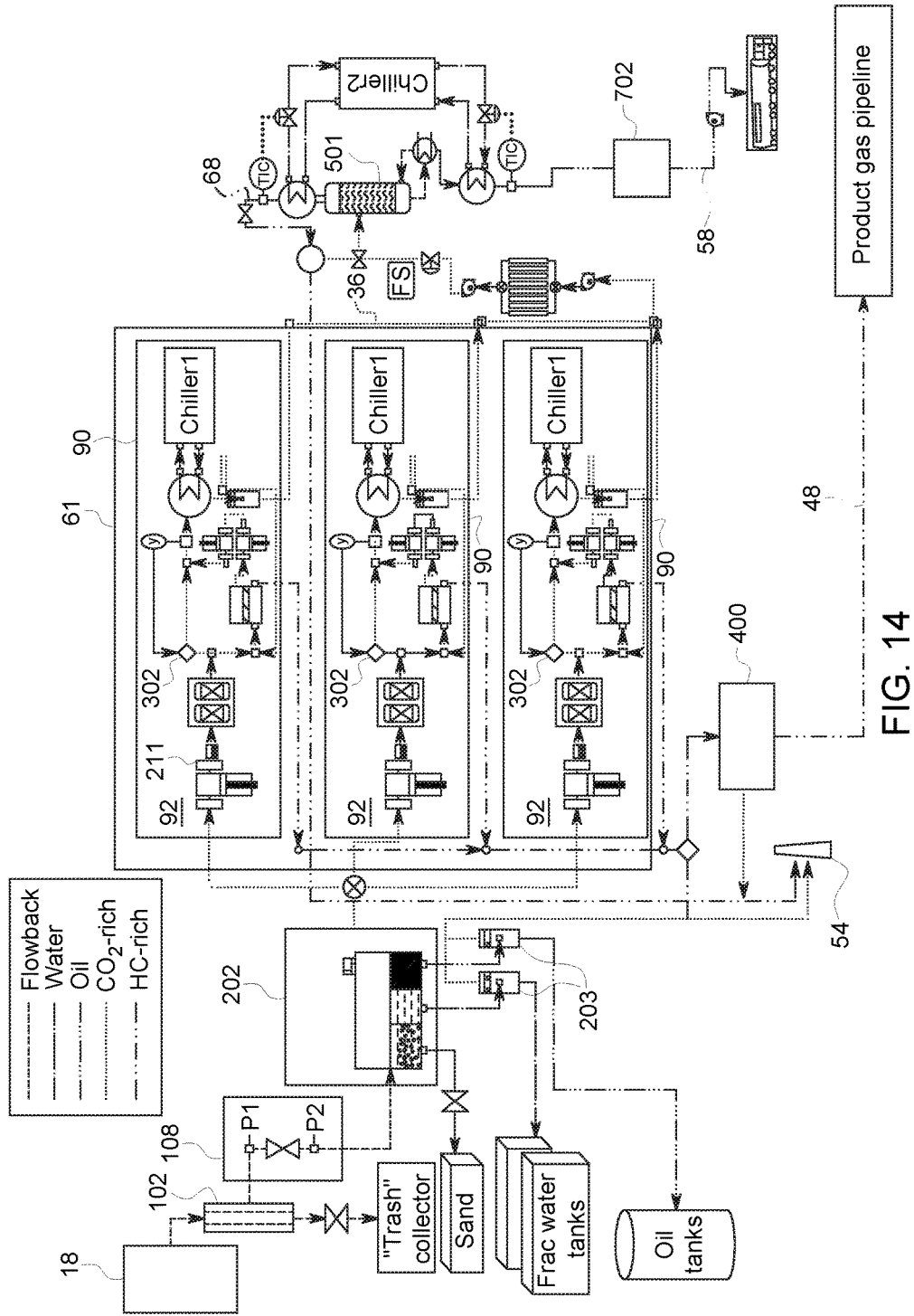
FIG. 14 is a detailed schematic diagram of a modified apparatus for the implementation of FIG. 11 including parallel $CO_2$-capture zones, in accordance with one or more embodiments shown or described herein.

Referring now to FIGS. 13 and 14, the flowrate and composition of the flowback process stream 28 entering the $CO_2$-capture zone 300 may change as a function of time due to changes in the flowrate and composition of the flowback stream 62, and the process operating conditions of associated equipment, such as the extent of flow to the enricher 303 by the flow splitter 302 and the recycled $CO_2$ in the VLS vapor stream 66 from the VLS 308 and in the distillate vapor stream 68 from the purifier 501. Consequently, the membrane area in the $CO_2$ enricher 303, in the $CO_2$-capture zone 300, required to achieve a desired extent of $CO_2$-separation may change as a function of flowback time. To solve this problem similar and perhaps identical membrane modules in the $CO_2$-capture zone 300 may be used to accomplish all or at least the major portion of $CO_2$-recovery as illustrated in FIGS. 13 and 14. For example, in FIG. 13, the process employs the configuration of the apparatus of FIG. 10 and provides for replication of the flowback gas compressor (210 in FIG. 4) as a set of three parallel compressors 211, 212, and 213, respectively, and similarly replication of the of the permeate gas compressor (306 in FIG. 4) as a set of four parallel compressors 312, 314, 316, 318. In an exemplary embodiment, to compress gas from 350 psig to 900 psig, if one or more AJAX 2802® compressors are employed, then the effective flow capacity would be in the range of 2 to 6 MMSCFD whereas with AJAX 2801® compressors this range would be 0.8 to 2 MMSCFD. Thus, if the anticipated flowrate profile is anticipated to vary between 2 to 15 MMSCFD then the capacity of the combined apparatus may be configured to include three AJAX2802® compressor or two AJAX2802® compressors and one AJAX2801® compressor. In FIG. 14, the process employs the configuration of FIG. 11 and provides for replication of three $CO_2$-capture modules 90 that are similar in scope, if not identical, so that the three modules 90 together will be able to service the entire flowback rate over the period of $CO_2$-recovery. In this embodiment, the feed compressor, and more particularly the high pressure gas compressor 211 may limit the flow handled by each module 90. In this example, each module 90 is designed to yield the Quality2 $CO_2$-stream 36. If this quality is sufficient for reuse then no further treatment is necessary. However, if a higher quality product is desired then it may be handled by the purifier 501 (e.g. stabilization column as shown in FIG. 14). Each module 90 may be configured as a single skid 92 or a series of interconnected skids 92 designed such that each skid 92 is independently transportable, but easily connected and commissioned/decommissioned quickly at the well-site. Many choices are available as to what each module 90 will contain and may be dependent on costs, weight, ease of assembly/disassembly, operability and flexibility.

Figure 15:
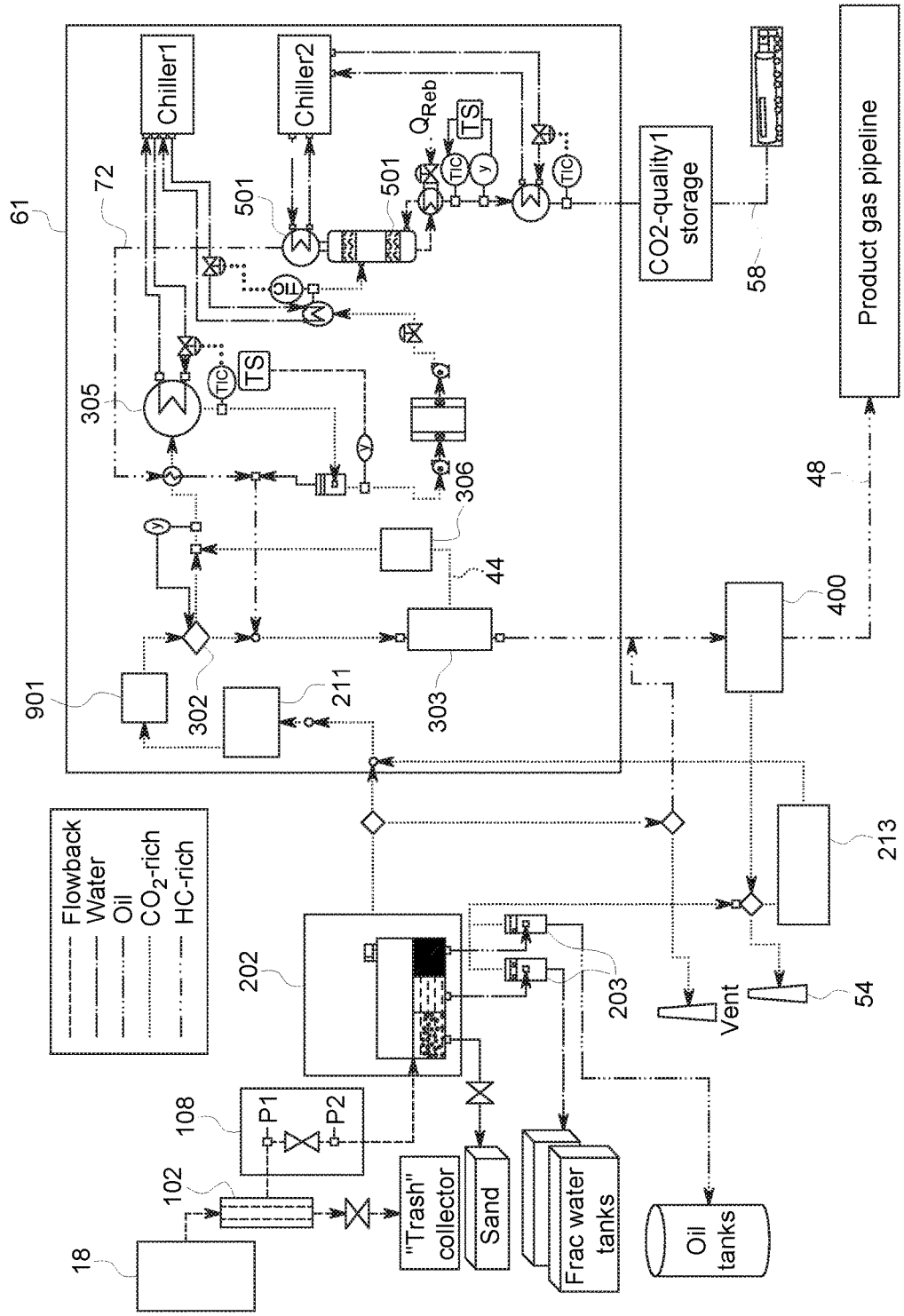
FIG. 15 is a detailed schematic diagram of a modified apparatus for the implementation of FIG. 9 including high pressure stabilization, in accordance with one or more embodiments shown or described herein.

Referring now to FIG. 15, in this particular embodiment the purifier 501, and more particularly, a stabilization column, is operated at high pressure, e.g. 900 psig. A stabilization re-boiler temperature is controlled to obtain desired bottoms % Cl to meet Quality1 $CO_2$-product specifications. The bottoms temperature is ~76° F. to meet a <1% Cl specification in the Quality1 CO2-product stream 58 and to allow storage/transport of the Quality1 $CO_2$-product stream 58 at 350 psig/–10 F. Operation at a high pressure provides overhead vapor from the partial condenser 501, in the form of a distillate vapor stream 68, to have lower $CO_2$-concentration (e.g. 40% $CO_2$ vs 58% at 350 psig column pressure, –20° F.) as it is returned to the enricher 303 in the $CO_2$-capture zone 300 without the need for recompression. In this particular configuration, an optional low pressure compressor 213 is included.

Figure 16:
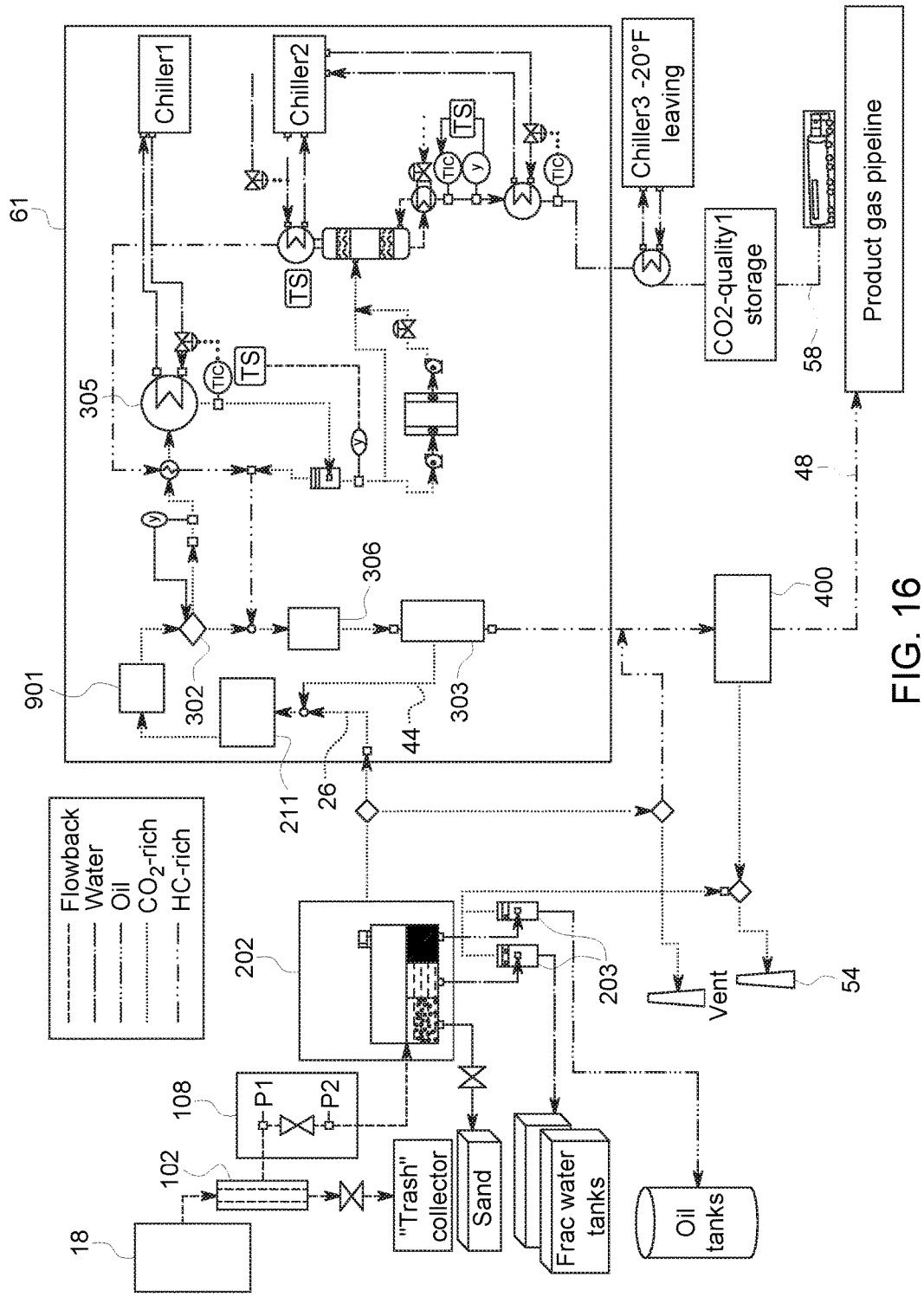
FIG. 16 is a detailed schematic diagram of a modified apparatus for the implementation of FIG. 9 including high pressure stabilization of a membrane permeate, in accordance with one or more embodiments shown or described herein.

Referring now to FIG. 16, in this particular embodiment the CO2-rich permeate stream 44 output from the CO2 enricher 303 is directed toward the output gas stream 26 exiting the medium pressure separator 202 and mixes therewith. No additional permeate compressor, such as compressor 306 (FIG. 15), is required.

Figure 17:
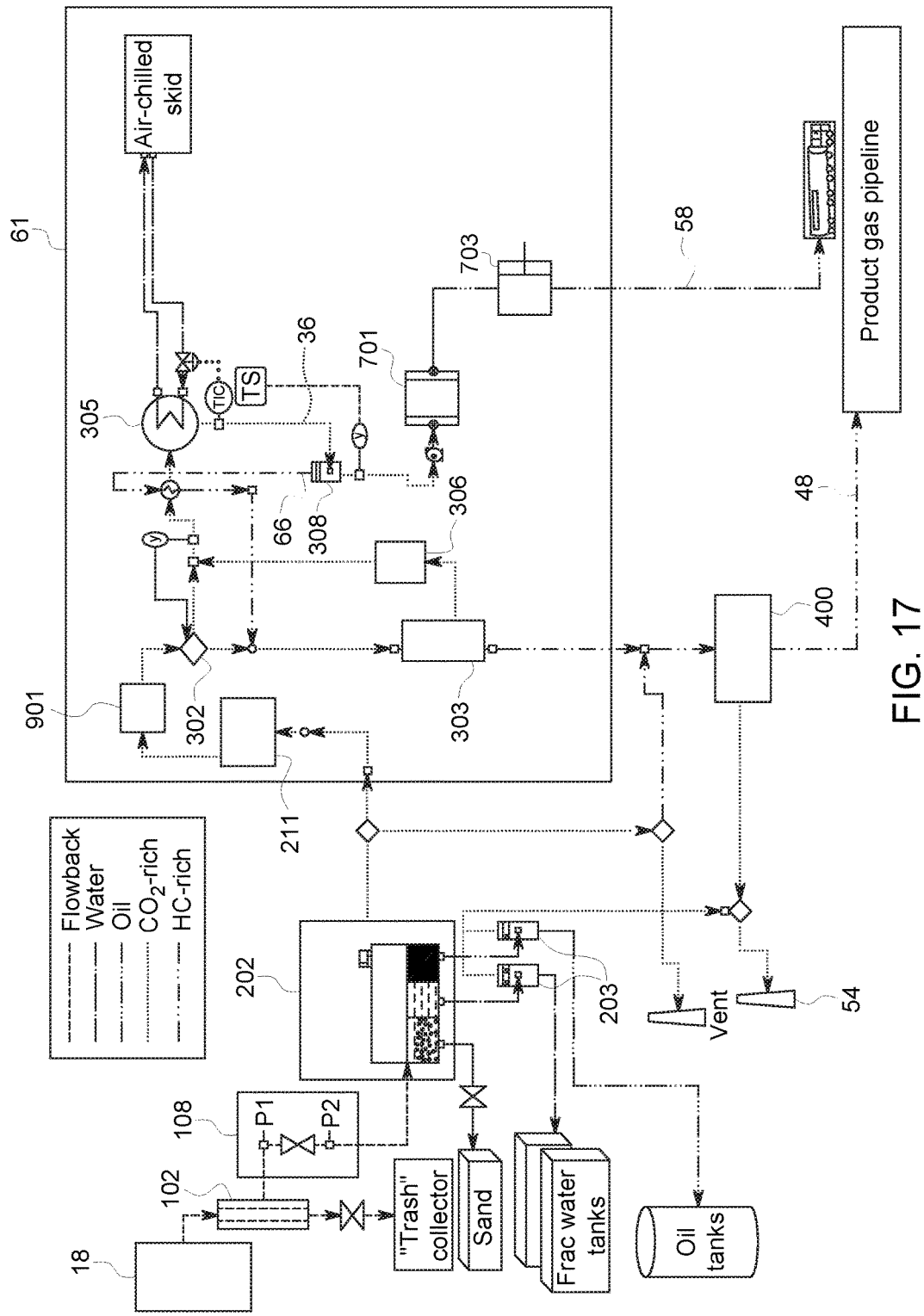
FIG. 17 is a detailed schematic diagram of a modified apparatus for the implementation of FIG. 9 without additional $CO_2$-purification, in accordance with one or more embodiments shown or described herein.

Referring now to FIG. 17, in this particular embodiment, product purity is achieved in the $CO_2$-capture zone 300, and more particularly in the condenser 305, resulting in a Quality2 $CO_2$-product stream 36 that does not require further processing. More particularly, in this particular embodiment there is no requirement for the inclusion of the one or more Quality2 $CO_2$-storage tanks (as previously described) or $CO_2$-purification because the product purity is achieved in the $CO_2$-capture zone 300. Flow splitter criterion (e.g. x_M % Cl or % $CO_2$ (e.g. <6% Cl or >90% $CO_2$) provides a steady feed concentration to the condenser 305 that condenses the bulk of the $CO_2$ in flowback. The condenser 305 temperature T1 is controlled based on the desired $CO_2$-concentration in the Quality2 $CO_2$-product stream 36, for example, x_Q2% Cl or % $CO_2$ (e.g. 60° F. at 900 psig to provide ~5% Cl or ~90% $CO_2$) to obtain approximately close to desired product purity. An included VLS 308 provides the opportunity to separate volatiles with an additional VLS stage (not shown) to obtain a desired Quality1 $CO_2$-product stream 58. A VLS vapor stream 66 may be sent for further $CO_2$-recovery in the $CO_2$-capture zone 300, and in particular to the $CO_2$-enricher 303 for $CO_2$-enrichment. The Quality1 $CO_2$-product stream 58 is directed to the one or more Quality1 storage tanks 701 at ~1,200 psig and ambient temperatures. The Quality1 $CO_2$-product stream 58 is pumped from the Quality1 storage tanks 701 via one or more $CO_2$-compressor pumps 703 to 2,000 psi, as desired, for transport via trucks or pipeline(s).

Figure 18:
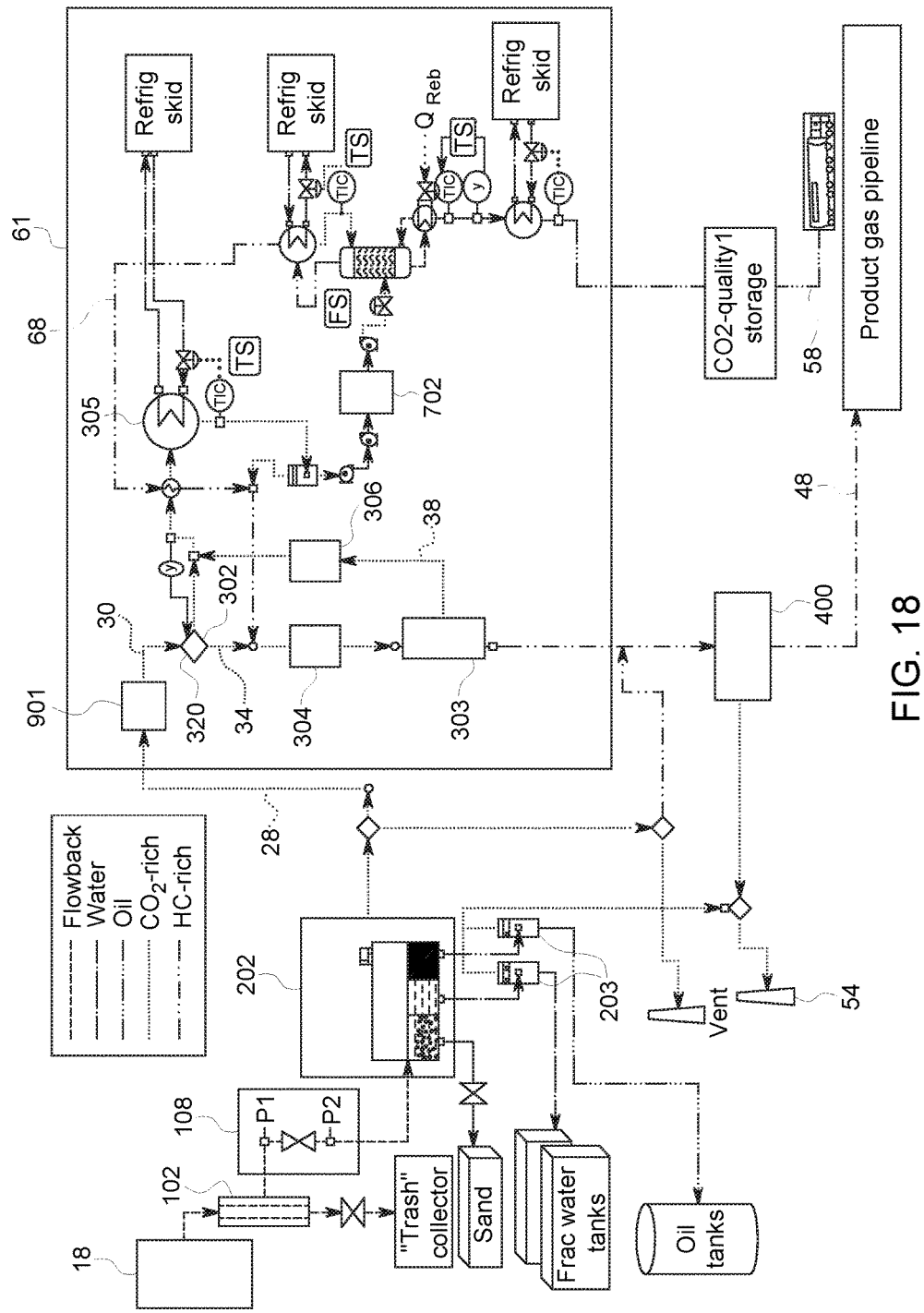
FIG. 18 is a detailed schematic diagram of a modified apparatus for the implementation of FIG. 6, in accordance with one or more embodiments shown or described herein.

Referring now to FIG. 18, in this particular embodiment, feed gas compression of the pretreated flowback process stream 30 in compressors 211, 212 and 213, such as described in the previous embodiments, is not required. The only required compression of the gas stream, and more specifically the pretreated flowback process stream 30, is the portion 34 of the pretreated flowback process stream 30 output and any return of the distillate vapor stream 68 to the enricher 303. In an embodiment, if $CO_2$-rich permeate stream 44 pressure is similar to the portion 32 of the pretreated flowback process stream 30, then the permeate gas compressor 306 would not be necessary. One or more condensers 305 provide for condensing of the enriched $CO_2$ stream 38. The configuration of the one or more condensers 305 as illustrated in this particular embodiment allows for operation of the one or more condensers 305 at a colder temperature, for example at 0° F. at 350 psig, versus ~50-60° F. @ 900 psig in the previous embodiments based on the configuration of FIG. 4.

Accordingly, the disclosure herein provides a solution to capture $CO_2$ from a $CO_2$ containing hydrocarbon flow stream, such as a post $CO_2$-stimulation flowback stream, for reuse during the flowback period of operations. Alternate flow streams using the flowback management and $CO_2$ recovery system as disclosed herein for $CO_2$ recovery are anticipated. The focus of this disclosure is optimal recovery of $CO_2$ from the post $CO_2$-stimulation flowback for reuse in oil and gas operations, such as reuse in stimulation of another well or in enhanced oil recovery (EOR). Hence, considerations, in addition to product recovery, at desired specifications are equipment costs, footprint occupied at the wellpad, ease of commission/use/decommission, and emission compliance. The disclosed process and apparatus configurations, may not provide complete 100% $CO_2$-recovery, but are intended to provide $CO_2$-recovery at an optimal percentage that is also economically viable for the well under consideration.

Optimal recovery of $CO_2$ from the post $CO_2$-stimulation flowback stream is based on the amount of $CO_2$ recoverable at the well-site: The efficiency of the $CO_2$-recovery from the post $CO_2$-stimulation flowback stream decreases as the $CO_2$-concentration in the post $CO_2$-stimulation flowback stream decreases as well as the flowrate. From an economic perspective, there may be minimum amount of $CO_2$-captured that would be necessary to justify the OPEX costs (equipment depreciation cost or rental, labor, energy) associated with the capture. For example, while $CO_2$ in the post $CO_2$-stimulation flowback stream may be high for a period of time (e.g. days 1 to 3 as illustrated in FIG. 5 where the $CO_2$ in flowback exceeds 200 tons/day), there is a sharp decline beyond day 3 to approximately 120 tons/day. In this case, an optimal recovery condition may be to operate the recovery only until day 3. Conversely, the equipment required to capture the peak production may be too large from perspectives of cost, footprint or logistics for storage/transport of the recovered $CO_2$ from the well-site. For example, instead of designing an apparatus to capture a peak of 720 tons/day, the optimal recovery may involve either reducing the flowback rate of the post $CO_2$-stimulation flowback stream (by choking at valve V1 in the flowback control zone 100, if possible), providing intermediate storage at the peak of the post $CO_2$-stimulation flowback stream, or diverting an excess portion of the post $CO_2$-stimulation flowback stream to a flare, while designing the $CO_2$-recovery apparatus for a lower maximum rate of, for example, 600 tons/day. Thus, the optimal point depends both on the flowback rate of the post $CO_2$-stimulation flowback stream as well as the $CO_2$-concentration in the post $CO_2$-stimulation flowback stream.

Figure 19:
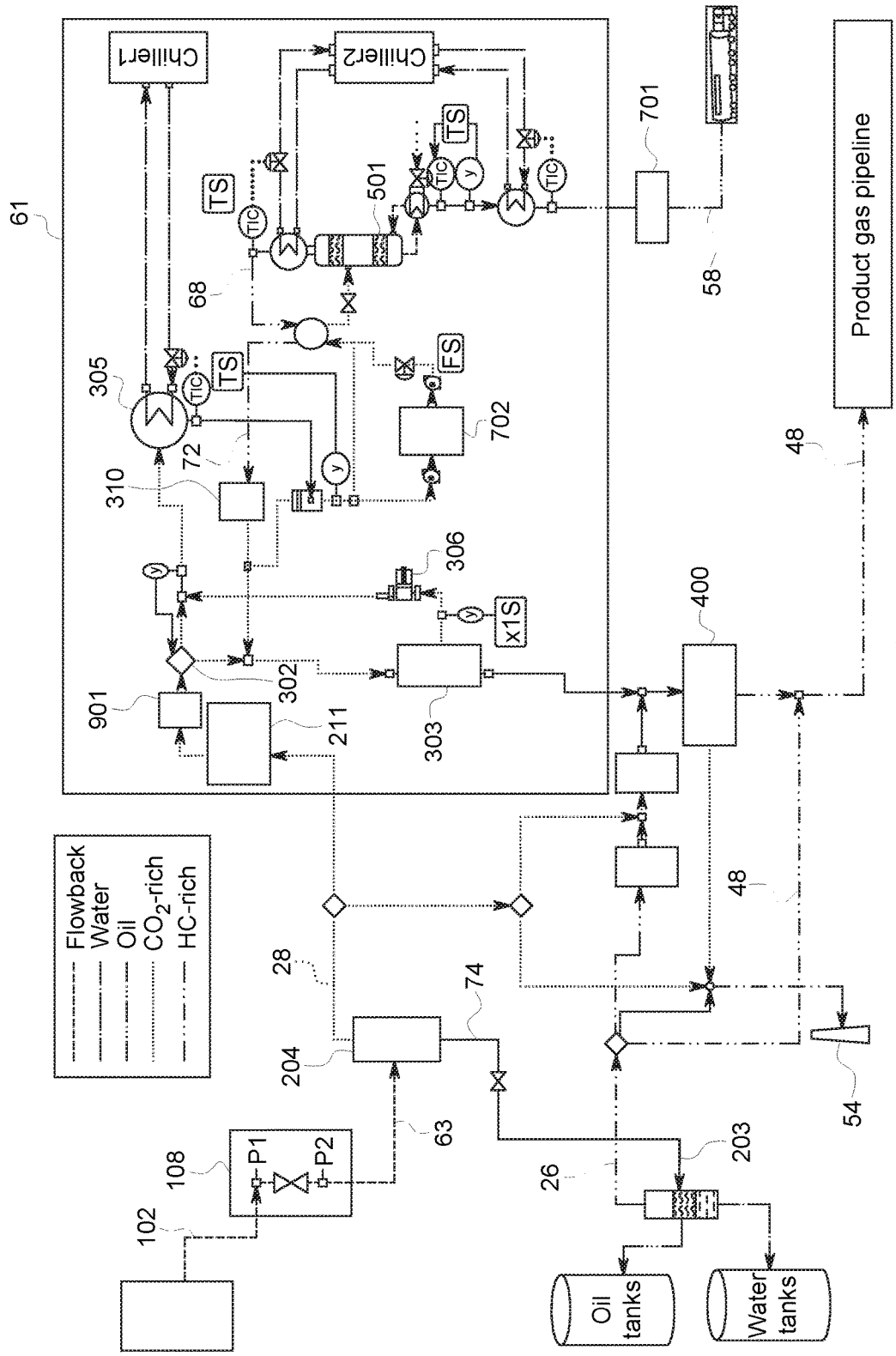
FIG. 19 is a detailed schematic diagram illustrating an alternate implementation of the apparatus for flowback management and $CO_2$-recovery configured for the production phase of operation, in accordance with one or more embodiments shown or described herein.
Figure 21:
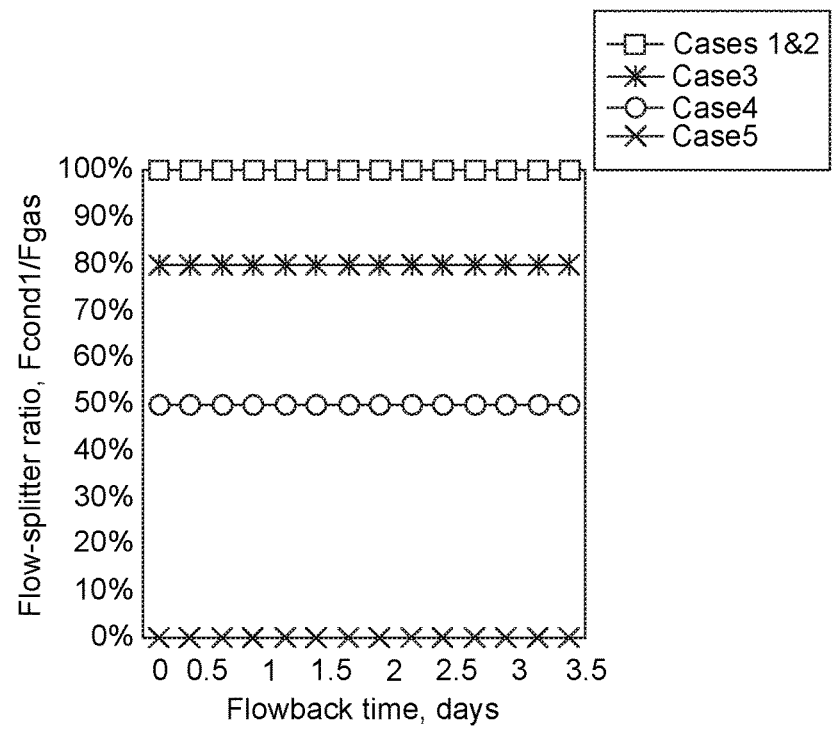
FIG. 21 is a graphical representation of the effect of flow splitter strategy on the $CO_2$-product purity and recovery for Case Studies 1-4, in accordance with one or more embodiments shown or described herein.

It is anticipated that the process and apparatus configurations described in this disclosure may also be used with some modifications for the production phase of operations. For example, in FIG. 19, the process employs the configuration of the apparatus of FIG. 11 but configured for the production phase of operation. The modified flowback stream 63, whose pressure may be controlled via valve V1, is sent to a vapor liquid separator (VLS) 204. Since no or negligible amount of sand and no trash is anticipated during this production phase of operations in comparison to the flowback phase of operations, the VLS 204 may be a vertical vessel with a pressure regulator on top to regulate the pressure of the output flowback process stream 28 sent for $CO_2$-capture. A flowback stream 74 that contains oil, water and residual gas is sent to the low pressure gas separator 203 wherein the gas is separated from oil and water. If the $CO_2$ concentration in the output gas stream 26 is sufficiently low to meet gas pipeline specifications, then it may be directed to a gas pipeline as a pipeline quality natural gas stream 48. However, if the $CO_2$-concentration is higher than the pipeline specifications then it may be sent to the flare 54 as a flare gas 51 or to the gas-cleanup zone 400.

It is anticipated that the various components of the apparatus may be built and delivered to the site on trailers so that the apparatus may be easily assembled, put into service and disassembled at end of the period of operation.

Referring now to FIGS. 20-32, illustrated are graphical representations of chemical process simulations data collected for Case Studies 1-9 with reference to the flowback profile illustrated in FIG. 5. The case studies were conducted via simulations using software widely used in the oil&Gas industry to evaluate gas separation scenarios. The vapor-liquid-equilibrium distributions at any temperature/pressure condition were obtained using the Peng-Robinson equation-of-state. The selectivities of the membrane of the enricher 303 for $CO_2$ relative to the other components were assumed to be as follows: Methane: 10, Ethane: 20, Propane: 30, Butanes (137), C5+ (280), H2O (0.5) and N2 (10). For Cases Studies 1-8 the $CO_2$-product was stabilized to 350 pisg and 6° F. This condition corresponded to about 1% Cl in the $CO_2$-Product (Quality' $CO_2$-product stream 58 of FIGS. 1-19).

Referring more specifically to FIG. 20, illustrated is a table summarizing data for the Case Studies 1-9 and the effect of a flow splitter, such as flow splitter 302 previously described, in an apparatus for flowback management and $CO_2$-recovery as disclosed herein (FIGS. 1-19). Illustrated for each case study is the average $CO_2$-concentration in the $CO_2$-product, the average C4+ concentration in the $CO_2$-product and the cumulative $CO_2$-recover percentage from the flowback with regard to changing flowsplitter ratio (FSR) as indicated.

Figure 22:
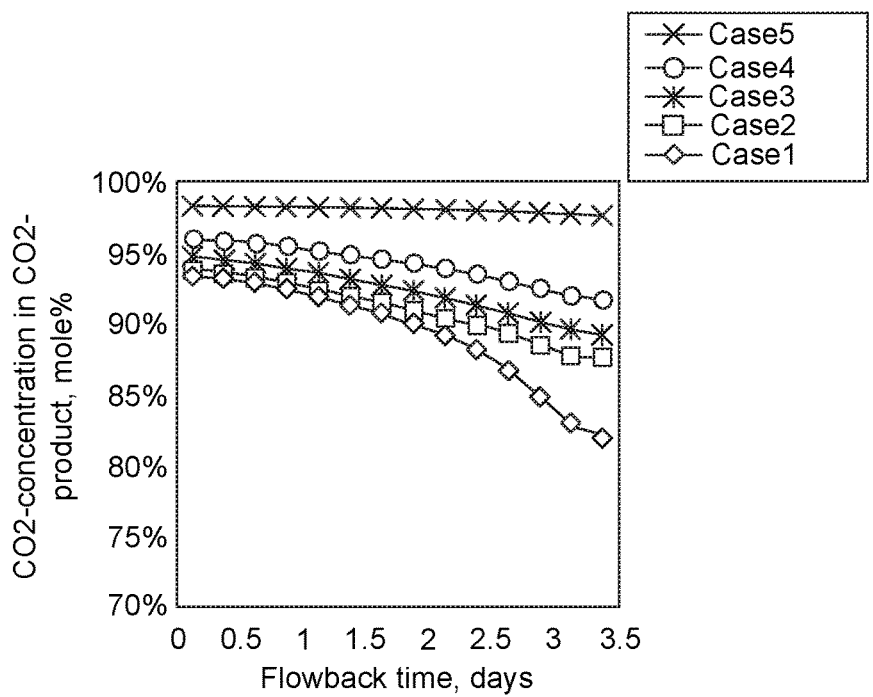
FIG. 22 is a is a graphical representation of the effect of flow splitter strategy on the $CO_2$-product purity, and in particular the $CO_2$ concentration as a percentage of the $CO_2$-product for Case Studies 1-4, in accordance with one or more embodiments shown or described herein.
Figure 23:
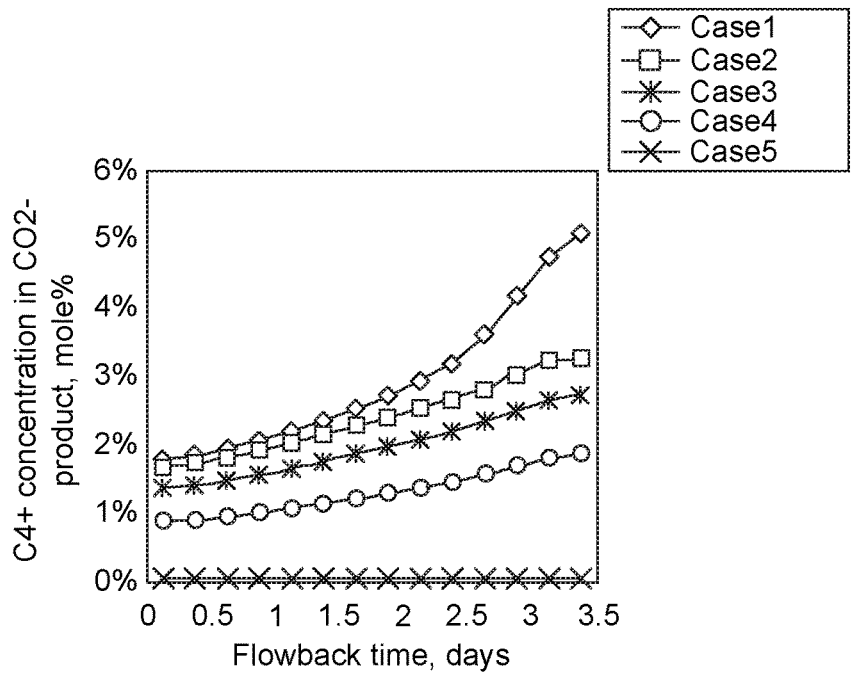
FIG. 23 is a is a graphical representation of the effect of flow splitter strategy on the $CO_2$-product purity, and in particular the C4+ concentration as a percentage in the $CO_2$-product for Case Studies 1-4, in accordance with one or more embodiments shown or described herein.
Figure 24:
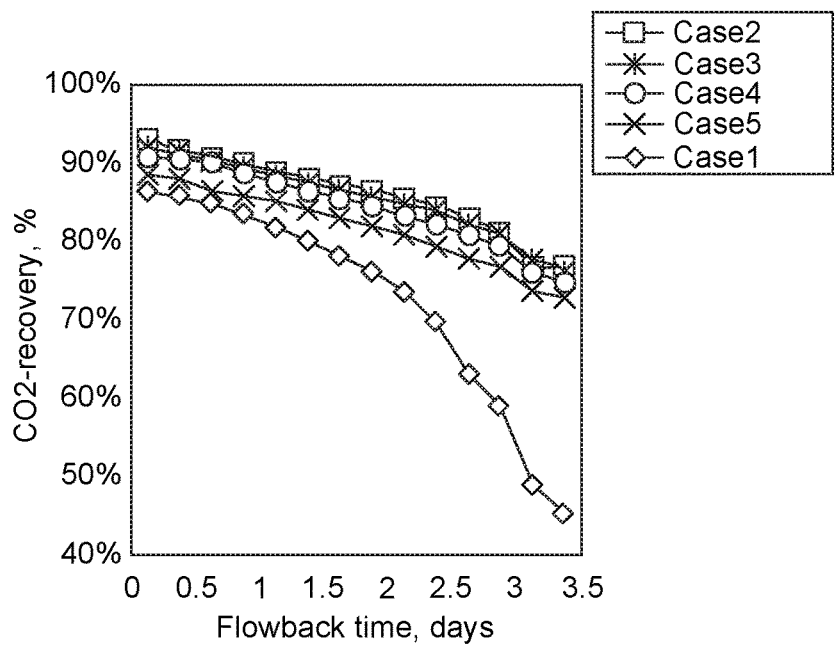
FIG. 24 is a is a graphical representation of the effect of flow splitter strategy on the $CO_2$-recovery, and in particular the $CO_2$ recovery as a percentage of the flowback over the flowback period for Case Studies 1-4, in accordance with one or more embodiments shown or described herein.
Figure 25:
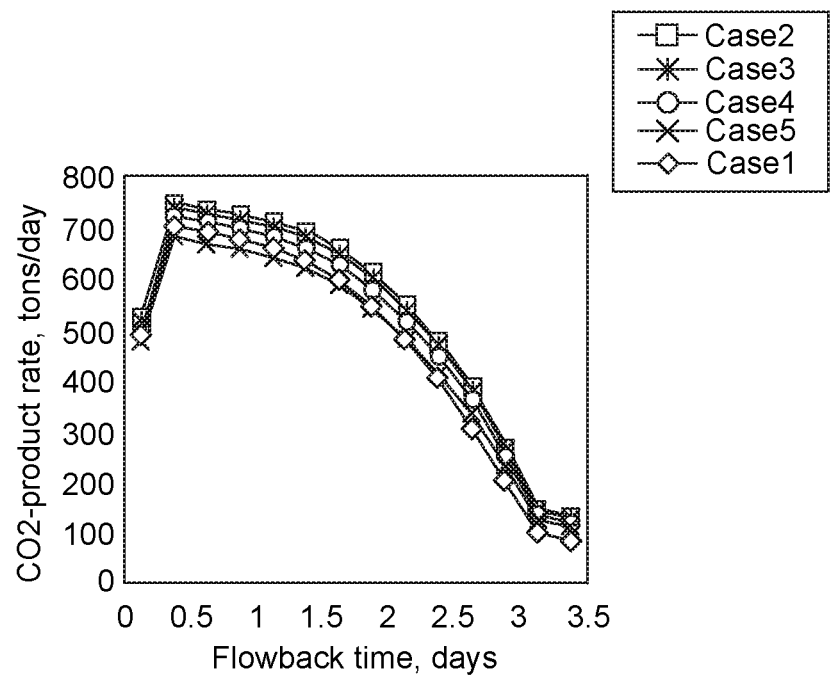
FIG. 25 is a is a graphical representation of the effect of flow splitter strategy on the $CO_2$-product recover, and in particular the $CO_2$-product recovery rate in tons per day over the flowback period for Case Studies 1-4, in accordance with one or more embodiments shown or described herein.
Figure 26:
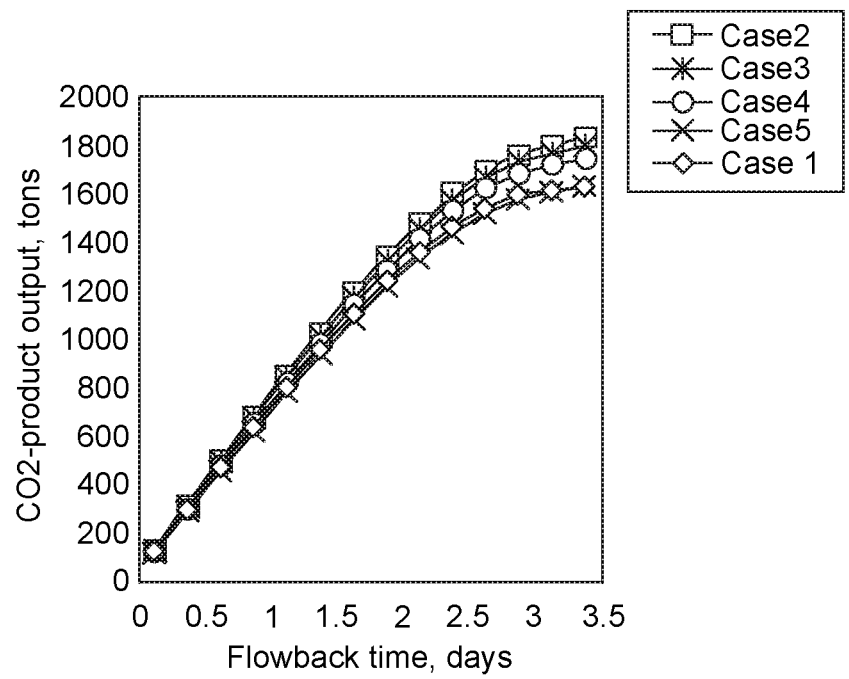
FIG. 26 is a is a graphical representation of the effect of flow splitter strategy on the $CO_2$-product recovery, and in particular the $CO_2$-product output in tons over the flowback period for Case Studies 1-4, in accordance with one or more embodiments shown or described herein.

Referring more specifically to FIGS. 21-26, illustrated in case study 1 is the case when the $CO_2$-enricher 303 is not employed; more specifically, the $CO_2$-capture process includes the condenser 305 and purification via a distillation column; the $CO_2$-lean distillate from the column is sent to flare. Also in FIGS. 21-26, illustrated for each case study 2-5 is a comparison of the effect of the FSR on the $CO_2$-product recovery and purity. For each case study 2-5, the FSR was held constant throughout the flowback period. The profiles in FIGS. 21-26 indicate that the $CO_2$-concentration in the $CO_2$-Product decreases significantly with the flowback time and the concentration of the C4+ components (a representative of the NGLs components) increases with time corresponding to the concentrations in the flowback profile of FIG. 5. Referring more specifically to FIGS. 21-26, for example, for Case 2, where the FSR is maintained at 100%, (i.e., all flowback is directed to the condenser 305 after mixing with the enriched-$CO_2$ stream 38) the $CO_2$-purity in the $CO_2$-product is initially 94 mole % $CO_2$ and then decreases to approximately 87.5 mole % $CO_2$ at the end of the flowback period (as best illustrated in FIG. 22). It was also observed that as more of the flowback process is directed to the $CO_2$-enricher 303, the $CO_2$-purity in the $CO_2$-product increases (as best illustrated in FIG. 22) and C4+ components concentration decreases (as best illustrated in FIG. 23) at any point of flowback time; but this higher purity also results in less $CO_2$-recovery (as best illustrated in FIG. 24-26). Thus, it was shown that the FSR employed during flowback management i.e., the extent of diversion of flowback gas flow via the flow splitter 302 (FIGS. 1-19) to the $CO_2$-enricher 303 (FIGS. 1-19) will help increase $CO_2$-purity in the $CO_2$-product, while decreasing $CO_2$-recovery. A decrease in FSR entails larger membrane area usage in the $CO_2$-enricher 303 and higher permeate compressor 306 costs.

Figure 27:
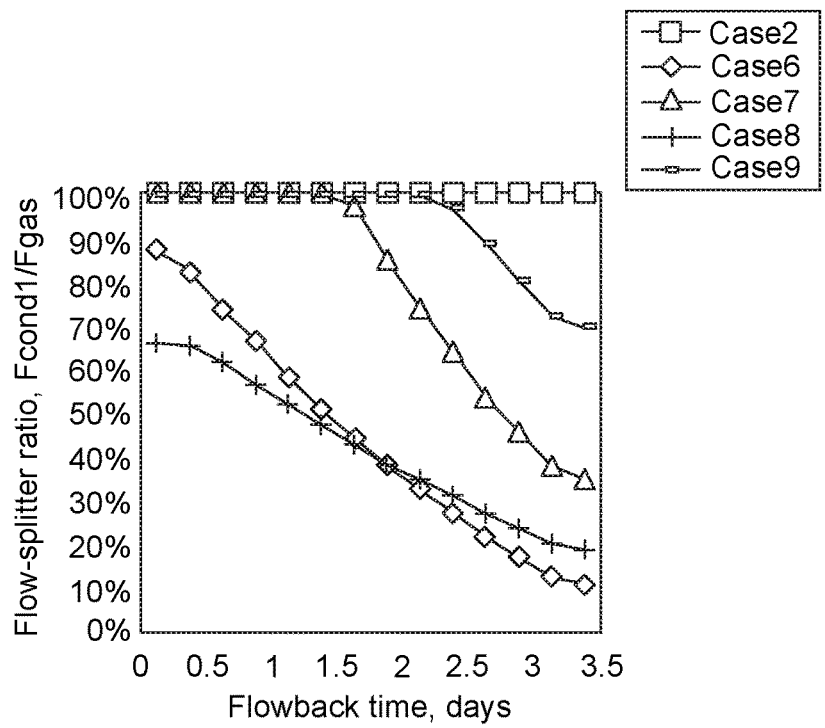
FIG. 27 is a graphical representation of the effect of flow splitter strategy on the $CO_2$-product purity and recovery for Case Studies 5-8, in accordance with one or more embodiments shown or described herein.
Figure 28:
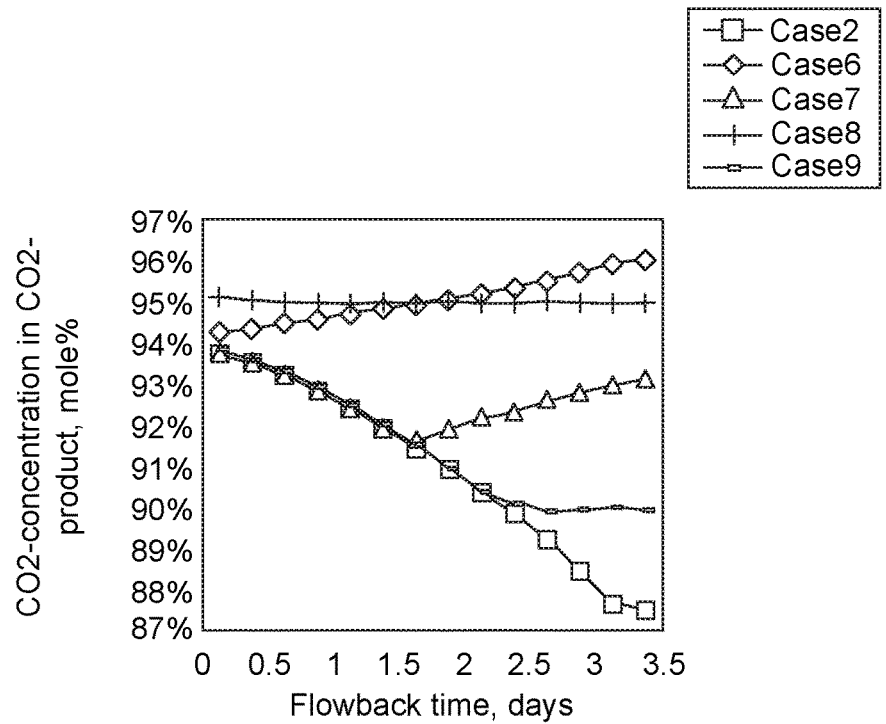
FIG. 28 is a is a graphical representation of the effect of flow splitter strategy on the $CO_2$-product purity, and in particular the $CO_2$ concentration as a percentage of the $CO_2$-product for Case Studies 5-8, in accordance with one or more embodiments shown or described herein.
Figure 29:
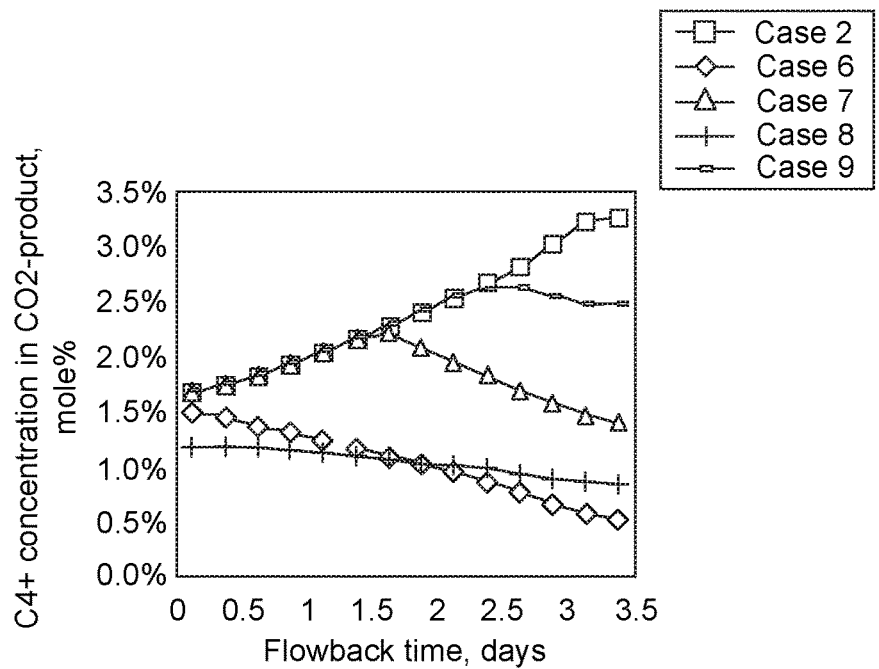
FIG. 29 is a is a graphical representation of the effect of flow splitter strategy on the $CO_2$-product purity, and in particular the C4+ concentration as a percentage in the $CO_2$-product for Case Studies 5-8, in accordance with one or more embodiments shown or described herein.
Figure 30:
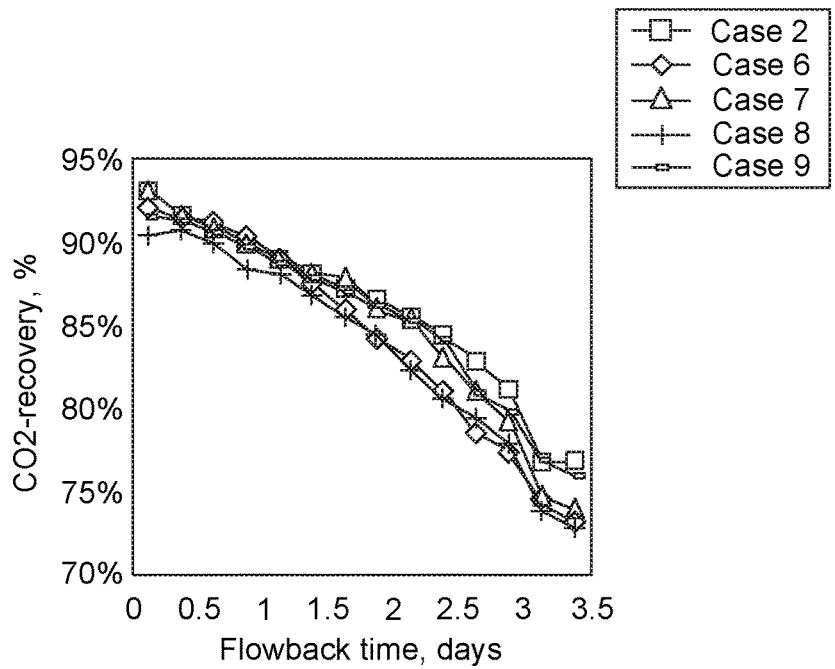
FIG. 30 is a is a graphical representation of the effect of flow splitter strategy on the $CO_2$-recovery, and in particular the $CO_2$ recovery as a percentage of the flowback over the flowback period for Case Studies 5-8, in accordance with one or more embodiments shown or described herein.
Figure 31:
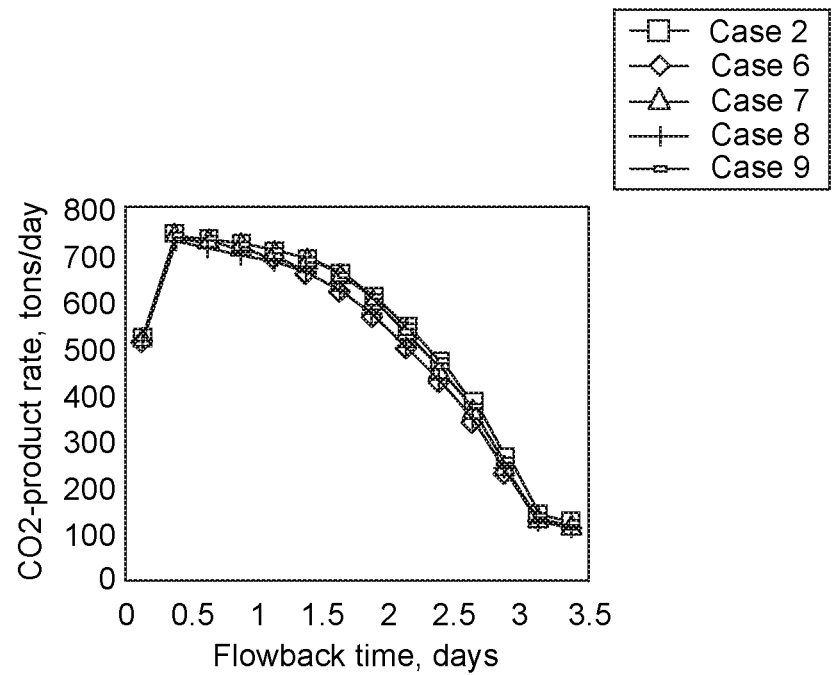
FIG. 31 is a is a graphical representation of the effect of flow splitter strategy on the $CO_2$-product recover, and in particular the $CO_2$-product recovery rate in tons per day over the flowback period for Case Studies 5-8, in accordance with one or more embodiments shown or described herein.
Figure 32:
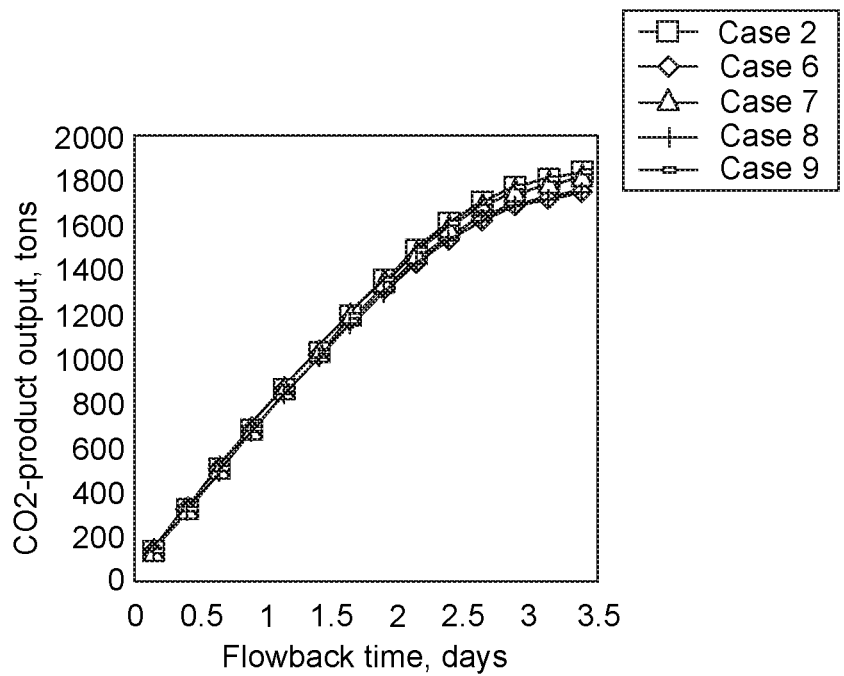
FIG. 32 is a is a graphical representation of the effect of flow splitter strategy on the $CO_2$-product recovery, and in particular the $CO_2$-product output in tons over the flowback period for Case Studies 5-8, in accordance with one or more embodiments shown or described herein.

Referring more specifically to FIGS. 27-32, illustrated for each case study 6-9 is a comparison of the effect of variations of the FSR on the $CO_2$-product recovery and purity (with reference to Case 2–fixed FSR=100%). For each case study 5-8, the FSR was varied throughout the flowback period as indicated based on control strategies that seek to hold a certain $CO_2$-stream composition at a desired value. Referring more specifically to Case Study 6, the $CO_2$-concentration of the mixed stream 40 (FIGS. 1-19) was held at 90% $CO_2$ and the FSR is varied accordingly. Data shows that the FSR is initially at approximately 90% and continually decreases to approximately 10% over the flowback period (as best illustrated in FIG. 27), while the $CO_2$-product purity appears to steadily increase from approximately 94.2% initially to 96% at the end of the flowback period (as best illustrated in FIG. 28). In Case Study 7, the FSR control strategy was to ensure that the $CO_2$-concentration in the mixed stream 40 (FIGS. 1-19) is always >=85 mole % $CO_2$. In this case, it was observed that the employed FSR profile initially follows the FSR=100% profile but at a certain time (approximately Day 1.675) FSR is decreased to meet the 85% $CO_2$ criterion in stream 40 (as best illustrated in FIG. 27); the FSR decreases from 100% to approximately 35% at end of this period (Day 3.5). The $CO_2$-purity in the $CO_2$-product illustrates a profile wherein the $CO_2$-concentration decreases from approximately 93.5% initially to approximately 91.5% at Day 1.625 and then increases to 93% at end of the period (as best illustrated in FIG. 28). The C4+ components concentration profile shows an increase from 1.6% to 2.3% at Day 1.625 and then decreases to 1.4% at end of the period (as best illustrated in FIG. 29). In Case Study 8, the flowback management objective for the FSR-control strategy was to ensure the $CO_2$-purity in the $CO_2$-product is >=95 mole % $CO_2$. In this case it was observes that the employed FSR profile is initially approximately 66% and then continually decreased to meet the objective with the final FSR value approximately 20% at the end of the period (as best illustrated in FIG. 27). The $CO_2$-concentration in the $CO_2$-product was steady, as desired at 95% (as best illustrated in FIG. 28). The C4+ components concentration was initially approximately 1.2% but decreased to approximately 0.8% at the end of the period (as best illustrated in FIG. 29). In Case Study 9, the flowback management objective for the FSR-control strategy was to ensure the $CO_2$-purity in the $CO_2$-product was >=90 mole % $CO_2$. In this case it was observed that the employed FSR profile was initially 100% (i.e. all flowback directed to the condenser 305) until Day 2.125 and then FSR was continually decreased to meet the objective with the final FSR value approximately 70% at the end of the period (as best illustrated in FIG. 27). The $CO_2$-concentration in the $CO_2$-product was initially >90% until Day 2.125 and then was steady, as desired at 90 mol % $CO_2$ (as best illustrated in FIG. 28). The C4+ components concentration rose from initially 1.7% to 2.6% at day 2.125 and then decreased to approximately 2.5% at the end of the period (as best illustrated in FIG. 29). Similar to Case Studies 2-5, higher purity results in less $CO_2$-recovery (as best illustrated in FIG. 30-32).

It was noted in a comparison of Case Studies 3 and 7, that in Case Study 3, the FSR was held constant at 80% throughout the period, whereas in Case Study 7, the objective was to ensure that the $CO_2$-concentration in the mixed stream 40 (FIGS. 1-19) was >=85 mole % $CO_2$. The $CO_2$-purity in the $CO_2$-product on a bulk-averaged basis (total $CO_2$ divided by total $CO_2$-product output) was same for both cases, while the actual $CO_2$-profiles for the $CO_2$-product along the flowback period were significantly distinct. For Case Study 3, the $CO_2$-product purity decreased steadily from approximately 94.5% $CO_2$ to 89% $CO_2$, whereas for Case Study 6, the $CO_2$-concentration in the $CO_2$-product remained between 91.5% and 93.8%.

Case Studies 1-9 are shown to elucidate the effectiveness of the flow management strategy disclosed herein to effectively control the $CO_2$-product purity within a desired range while optimizing the system for $CO_2$-recovery in terms of capital costs, operating costs, footprint and easy implementation at the well-site. As previously stated, in practice, the flowback from the well is highly dependent on the reservoir, the amount of $CO_2$ used for stimulation, the operating conditions during the $CO_2$-stimulation and the flowback conditions. In effect, the flowback rates and compositions will vary between wells and, as described previously, with time. The flowback management strategy disclosed herein provides a means to respond to the changes in the flowrate in order to control the $CO_2$-recovery process operating conditions to yield $CO_2$-purity within a desired range, while optimizing the $CO_2$-recovery on a continual basis during the flowback period or the production period.

The foregoing has described an apparatus and method of recovery of $CO_2$ from a post $CO_2$-stimulation flowback. While the present disclosure has been described with respect to a limited number of embodiments, those skilled in the art, having benefit of this disclosure, will appreciate that other embodiments may be devised which do not depart from the scope of the disclosure as described herein. While the present disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out the disclosure. It is, therefore, to be understood that the appended claims are intended to cover all such modifications and changes as fall within the true spirit of the disclosure.

The invention claimed is:

1. An apparatus for flow management and $CO_2$-recovery from a $CO_2$ containing hydrocarbon flow stream comprising:
    a flow control zone in fluid communication with the $CO_2$ containing hydrocarbon flow stream to provide control of a flowrate of the $CO_2$ containing hydrocarbon flow stream and output a modified $CO_2$ containing hydrocarbon flow stream;
    a gas separation zone in fluid communication with the modified $CO_2$ containing hydrocarbon flow stream to provide separation of a gas from the modified $CO_2$ containing hydrocarbon flow stream and output a $CO_2$ containing hydrocarbon process stream;
    a pretreatment zone in fluid communication with the gas separation zone to provide removal of one or more of trace solids, aerogels, oil, hydrogen sulfides, water and non-gas liquids from the $CO_2$ containing hydrocarbon process stream and output a pretreated flowback gas stream; and
    a $CO_2$-capture zone in fluid communication with the pretreatment zone to provide $CO_2$-capture from the pretreated flowback gas stream and output a captured $CO_2$-flow stream, the $CO_2$-capture zone including a flow splitter to direct a second portion of the pretreated flowback gas stream to a $CO_2$-enricher to provide an enriched $CO_2$-stream for mixing with a first portion of the pretreated flowback gas stream to form a mixed gas stream, the $CO_2$-capture zone further including at least one condenser to output the captured $CO_2$-flow stream, wherein the $CO_2$-enricher comprises a $CO_2$-selective membrane.

2. An apparatus for flowback management and $CO_2$-recovery from a post $CO_2$-stimulation flowback stream comprising:
    a flow control zone in fluid communication with the post $CO_2$-stimulation flowback stream to provide control of a flowrate of the post $CO_2$-stimulation flowback stream and output a modified flowback stream;
    a gas separation zone in fluid communication with the modified flowback stream to provide separation of a gas from the modified flowback stream and output a flowback process stream;
    a pretreatment zone in fluid communication with the gas separation zone to provide removal of one or more of trace solids, aerogels, oil, hydrogen sulfides, water and non-gas liquids from the flowback process stream and output a pretreated flowback gas stream; and
    a $CO_2$-capture zone in fluid communication with the pretreatment zone to provide $CO_2$-capture from the pretreated flowback gas stream and output a captured $CO_2$-flow stream, the $CO_2$-capture zone including a flow splitter to direct a second portion of the pretreated flowback gas stream to a $CO_2$-enricher to provide an enriched $CO_2$-stream for mixing with a first portion of the pretreated flowback gas stream to form a mixed gas stream, the $CO_2$-capture zone further including at least one condenser to output the captured $CO_2$-flow stream, wherein the $CO_2$-enricher comprises a $CO_2$-selective membrane.

3. The apparatus of claim 2, further comprising a $CO_2$-storage zone in fluid communication with the $CO_2$-capture zone and a $CO_2$-purification zone in fluid communication with the $CO_2$-capture zone, the $CO_2$-storage zone providing buffer storage and control of a flowrate of the captured $CO_2$-flow stream to the purification zone, the purification zone providing purification of the captured $CO_2$-flow stream and output of a $CO_2$-product stream.

4. The apparatus of claim 2, further comprising a gas cleanup zone in fluid communication with the $CO_2$ enricher to treat a portion of a $CO_2$-lean gas retentate stream and output a pipeline quality natural gas stream and a $CO_2$-rich permeate stream.

5. The apparatus of claim 2, further comprising a $CO_2$-transfer zone in fluid communication with the $CO_2$-capture zone to provide transfer of the captured $CO_2$-flow stream as a $CO_2$-product stream for product end use.

6. The apparatus of claim 2, wherein the pretreatment zone includes one or more of mechanical filters, coalescers, $H_2S$-scavengers, $H_2S$-selective membranes, $H_2O$-selective membranes and dessicants.

7. The apparatus of claim 2, wherein the flow splitter is operational to vary the portion of the pretreated flowback gas stream to the condenser to meet target $CO_2$-stream specifications at one or more locations in the apparatus.

8. The apparatus of claim 7, wherein the target CO2-stream specifications are in one of $CO_2$-concentration or undesired components concentration in a respective flow stream.

9. The apparatus of claim 2, wherein the flow splitter is operational to vary the portion of the pretreated flowback to the condenser between 0%-100%.

10. The apparatus of claim 2, wherein the gas separation zone includes one or more gas separators providing varied operation in response to one or more of a flowrate and composition of the post $CO_2$-stimulation flowback stream.

11. The apparatus of claim 2, wherein the $CO_2$-purification zone employs at least one of a heater, a cooler, an expander, a distillation column.

12. The apparatus of claim 2, comprising a plurality of $CO_2$-capture zones configured in parallel such that the combined capacity satisfies an anticipated maximum flowrate of the post $CO_2$-stimulation flowback stream.

13. An apparatus for flowback management and $CO_2$-recovery from a post $CO_2$-stimulation flowback stream comprising:
a flowback processing unit to receive and process post $CO_2$-stimulation flowback stream and output a flowback stream at desired pressure and temperature;
a pretreatment unit to receive and remove contaminants from the flowback stream and output a pretreated flowback stream;
a flow splitter in fluid communication with the pretreatment unit to direct a first portion of the pretreated flowback stream to a condenser and a second portion of the pretreated flowback stream to a $CO_2$-enricher to output an enriched $CO_2$ flow stream to mix with the first portion of the pretreated flowback stream and output from the condenser a captured $CO_2$ flow stream, wherein the $CO_2$-enricher comprises a $CO_2$-selective membrane.

14. The apparatus of claim 13, further comprising one or more purification components to purify the captured $CO_2$ flow stream to a known specification and output a $CO_2$-product stream.

15. The apparatus of claim 13, wherein the flow splitter is operational to vary the portion of the pretreated flowback gas stream to the condenser to meet target $CO_2$-stream specifications at one or more locations in the apparatus.

16. The apparatus of claim 15, wherein the target $CO_2$-stream specifications are in one of $CO_2$-concentration or undesired components concentration in a respective flow stream.

17. The apparatus of claim 13, wherein the $CO_2$-selective membrane comprises one or more of a polyetheretherketone (PEEK), cellulose acetate and a polyimide.

18. The apparatus of claim 13, wherein the $CO_2$-selective membrane is stable to hydrocarbon condensates.

19. The apparatus of claim 13, wherein the enricher is operational to vary the enrichment of the enriched $CO_2$ flow stream output to the condenser to meet target $CO_2$-stream specifications at one or more locations in the apparatus.

20. The apparatus of claim 13, wherein the $CO_2$-concentration in the enriched $CO_2$ flow stream is in a range of 85% to >99%.

21. The apparatus of claim 13, wherein the $CO_2$-enricher includes a plurality of parallel membrane systems, each of the plurality of parallel membrane systems having a separation capacity, wherein the separation capacity of the plurality of parallel membrane systems are one of equal or unequal to one another, and wherein each of the plurality of parallel membrane systems comprises the $CO_2$-selective membrane.

22. The apparatus of claim 21, wherein a number of employed parallel membrane systems of the plurality of parallel membrane systems is variable over a flowback period in response to a change in a separation duty required to obtain optimal $CO_2$-recovery subject to target $CO_2$-product specifications.

23. The apparatus of claim 13, wherein the $CO_2$-enricher includes a plurality of membrane systems in series, each of the plurality of membrane systems having a separation capacity, wherein the separation capacity of the plurality of membrane systems in series are one of equal or unequal to one another, and wherein each of the plurality of membrane systems in series comprises the $CO_2$-selective membrane.

24. A method for flowback management and $CO_2$-recovery from a post $CO_2$-stimulation flowback stream comprising:
processing a post $CO_2$-stimulation flowback stream to yield a processed flowback stream at a desired pressure and temperature;
pretreating the processed flowback stream to remove one or more contaminants and output a pretreated flowback stream;
directing a first portion of the pretreated flowback stream to a condenser and directing a second portion of the pretreated flowback stream to a $CO_2$-enricher, the $CO_2$-enricher outputting an enriched $CO_2$-flow stream to mix with the first portion of the pretreated flowback stream and provide a captured $CO_2$-flow stream, wherein the $CO_2$-enricher comprises a $CO_2$-selective membrane; and
transferring the captured $CO_2$-flow stream as a $CO_2$-product stream for product end use.

25. The method of claim 24, further comprising purifying the captured $CO_2$-flow stream to a known specification to output the $CO_2$-product stream.

* * * * *